(12) United States Patent  
Schultz et al.

(10) Patent No.: US 9,110,608 B2  
(45) Date of Patent: Aug. 18, 2015

(54) METHOD AND SYSTEM FOR SECURE MOBILE PRINTING

(75) Inventors: Paul T. Schultz, Colorado Springs, CO (US); Mark J. Hahn, Stow, MA (US); Robert A. Sartini, Colorado Springs, CO (US); Todd M. Willis, Woodstock, MD (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 48 days.

(21) Appl. No.: 13/250,294

(22) Filed: Sep. 30, 2011

(65) Prior Publication Data

US 2013/0085968 A1  Apr. 4, 2013

(51) Int. Cl.
| | |
|---|---|
| *G06K 15/02* | (2006.01) |
| *G06F 17/00* | (2006.01) |
| *G06F 3/12* | (2006.01) |
| *G06F 21/32* | (2013.01) |
| *G06F 21/34* | (2013.01) |
| *G06Q 30/02* | (2012.01) |
| *G06F 21/60* | (2013.01) |

(52) U.S. Cl.
CPC .............. *G06F 3/1204* (2013.01); *G06F 3/126* (2013.01); *G06F 3/1207* (2013.01); *G06F 3/1222* (2013.01); *G06F 3/1228* (2013.01); *G06F 3/1238* (2013.01); *G06F 3/1292* (2013.01); *G06F 21/32* (2013.01); *G06F 21/608* (2013.01); *G06Q 30/0283* (2013.01)

(58) Field of Classification Search
CPC . G06F 21/608; G06F 3/1292; G06F 3/10238; G06F 3/1265; G06Q 20/3276; G06Q 20/32; G06Q 20/325; G06Q 30/0283
See application file for complete search history.

(56) References Cited

U.S. PATENT DOCUMENTS

| | | | | |
|---|---|---|---|---|
| 2,159,957 | A * | 5/1939 | Ormond | 229/68.1 |
| 5,602,973 | A * | 2/1997 | Nishiwaki | 358/1.14 |
| 5,690,774 | A * | 11/1997 | Greene | 156/269 |
| 6,568,538 | B1 * | 5/2003 | Robey | 209/630 |
| 7,791,752 | B2 * | 9/2010 | Eschbach et al. | 358/1.15 |
| 8,155,957 | B1 * | 4/2012 | Takens | 704/235 |
| 2002/0152183 | A1 * | 10/2002 | Soares et al. | 705/400 |
| 2002/0169002 | A1 * | 11/2002 | Imbrie et al. | 455/557 |
| 2003/0133146 | A1 * | 7/2003 | Parry | 358/1.15 |
| 2005/0099653 | A1 * | 5/2005 | Kawaoka | 358/1.15 |
| 2005/0270564 | A1 * | 12/2005 | Yun | 358/1.15 |
| 2007/0182984 | A1 * | 8/2007 | Ragnet et al. | 358/1.15 |
| 2008/0037043 | A1 * | 2/2008 | Hull et al. | 358/1.8 |
| 2008/0231890 | A1 * | 9/2008 | Kishi | 358/1.15 |
| 2008/0320296 | A1 * | 12/2008 | Walker et al. | 713/150 |
| 2009/0033972 | A1 * | 2/2009 | Kato | 358/1.13 |
| 2009/0034731 | A1 * | 2/2009 | Oshima | 380/270 |
| 2009/0083850 | A1 * | 3/2009 | Fadell et al. | 726/19 |
| 2009/0244620 | A1 * | 10/2009 | Takahashi et al. | 358/1.15 |
| 2009/0248632 | A1 * | 10/2009 | Subramanian | 707/3 |
| 2009/0310178 | A1 * | 12/2009 | Tomita et al. | 358/1.15 |
| 2010/0082241 | A1 * | 4/2010 | Trivedi | 701/208 |
| 2010/0191972 | A1 * | 7/2010 | Kiliccote | 713/172 |
| 2010/0199278 | A1 * | 8/2010 | Tomita | 718/100 |
| 2010/0230018 | A1 * | 9/2010 | Nielsen | 150/102 |

(Continued)

*Primary Examiner* — Kevin Flynn  
*Assistant Examiner* — Brian Tallman

(57) ABSTRACT

An approach is provided for secured mobile printing. A printing platform receives a printing request, generates authenticating information associated with the print request, and sends the authenticating information to a mobile device for retrieval of printed materials generated in response to the printing request.

14 Claims, 15 Drawing Sheets

(56) References Cited

U.S. PATENT DOCUMENTS

| | | | |
|---|---|---|---|
| 2010/0309505 A1* | 12/2010 | Partridge et al. | 358/1.15 |
| 2011/0096354 A1* | 4/2011 | Liu | 358/1.15 |
| 2011/0215921 A1* | 9/2011 | Ben Ayed et al. | 340/539.11 |
| 2011/0261390 A1* | 10/2011 | Ray et al. | 358/1.15 |
| 2011/0310428 A1* | 12/2011 | Ciriza et al. | 358/1.15 |
| 2012/0002980 A1* | 1/2012 | Tse et al. | 399/8 |
| 2012/0013922 A1* | 1/2012 | Lotz et al. | 358/1.9 |
| 2012/0019867 A1* | 1/2012 | Prati et al. | 358/1.15 |
| 2012/0026536 A1* | 2/2012 | Shah | 358/1.15 |
| 2012/0033245 A1* | 2/2012 | Kurahashi | 358/1.14 |
| 2013/0054491 A1* | 2/2013 | Chatow et al. | 705/400 |

\* cited by examiner

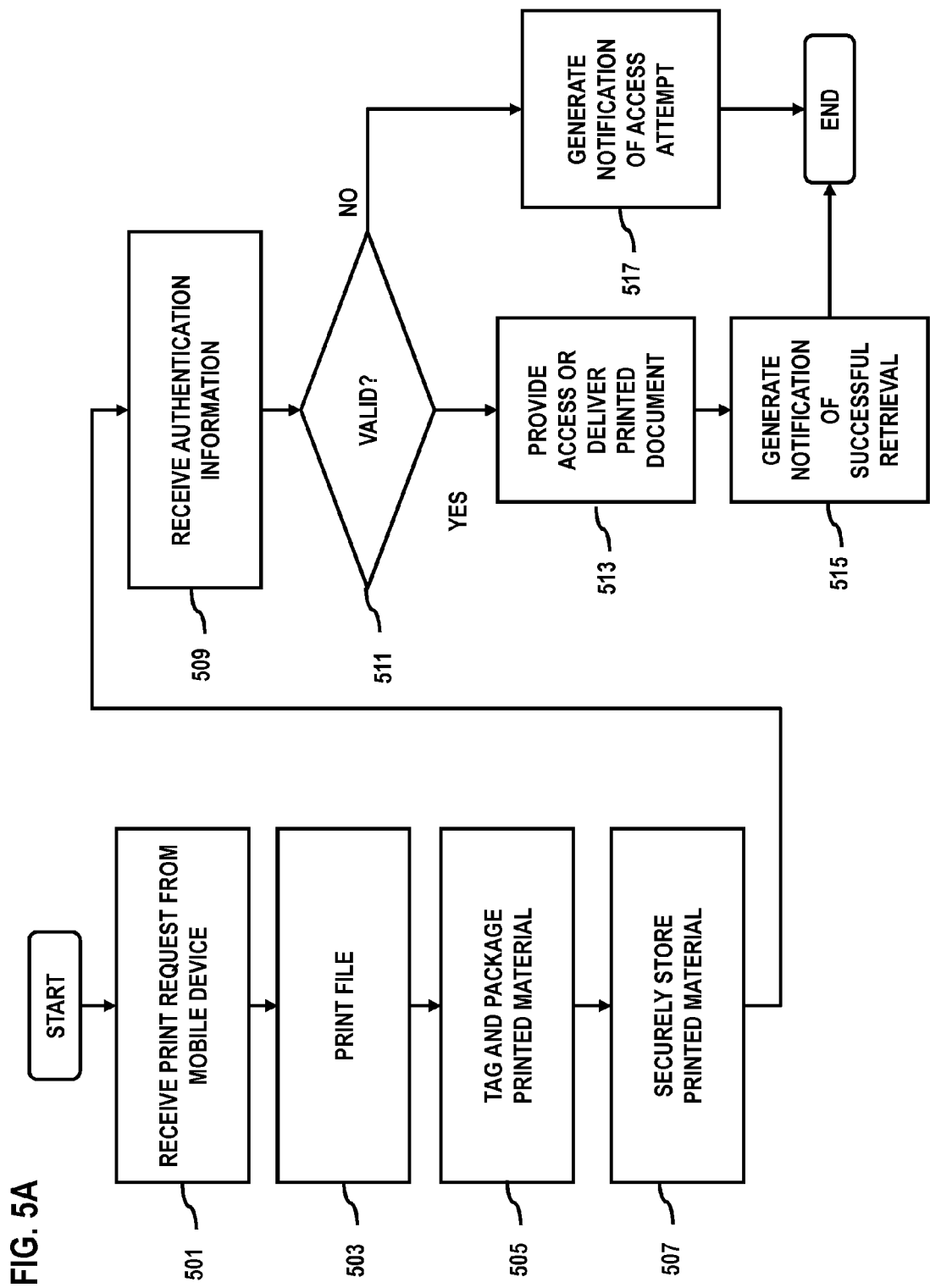

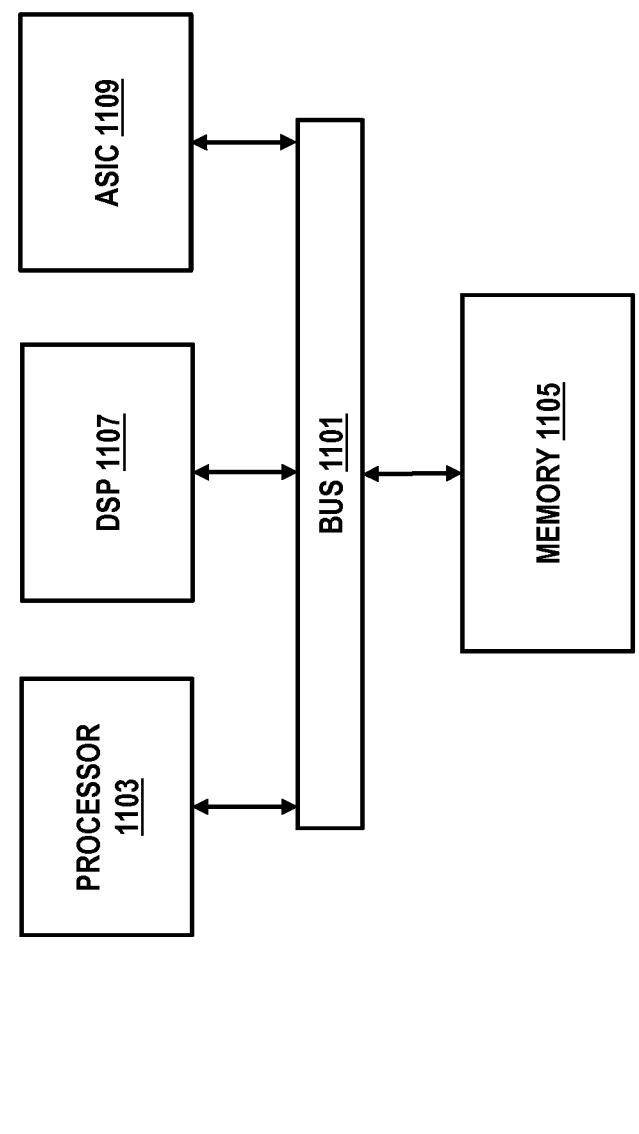

METHOD AND SYSTEM FOR SECURE MOBILE PRINTING

BACKGROUND INFORMATION

Wireless networking technologies offer users the convenience of mobility and ease of connection to a network. Mobile devices have inherent capabilities such as location detection, and messaging that are easy to use, secure and convenient to the user. Despite these inherent capabilities, traditional methods for printing documents from mobile devices can be burdensome and inconvenient to the user. For example, users printing from their mobile phones often must locate a printing facility, estimate cost, and wait at the printing facility for the file to print. Additionally, files may often be transferred from a mobile device via a physical connection by removing a memory card from the mobile device or by use of a USB cable. The use of these physical connections requires the user to transfer the file at the printing facility and add to the inconvenience and delay of printing. Therefore, there is a need for an approach that provides for convenient and secure printing using mobile devices.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 5A is a flowchart of a process for handling a request to access the printed material for secured mobile printing, according to an exemplary embodiment;

FIG. 10 is a diagram of a computer system that can be used to implement various exemplary embodiments and FIG. 11 is a diagram of a chip set that can be used to implement an embodiment of the invention.

DESCRIPTION OF THE PREFERRED EMBODIMENT

A preferred apparatus, method and software for providing secure mobile printing for mobile devices are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Figure 1:
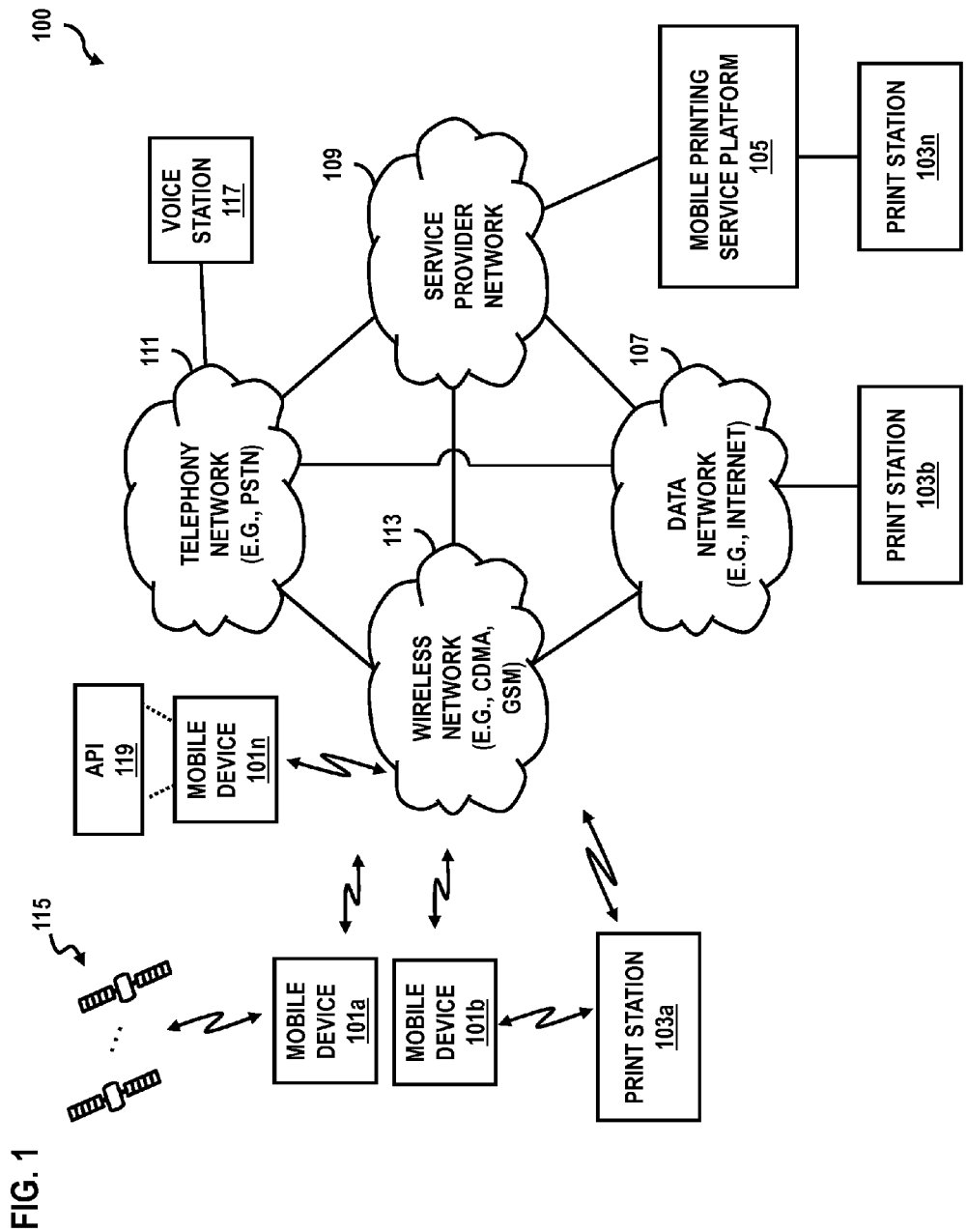
FIG. 1 is a diagram of a system capable of securing mobile printing, according to an exemplary embodiment.

FIG. 1 is a diagram of a system capable of conducting secure printing using mobile devices, according to an exemplary embodiment. For the purpose of illustration, the system 100 employs, mobile devices 101a, 101b, and 101n (also collectively referred to as mobile device(s) 101), print stations 103a, 103b, and 103n (also collectively referred to as print station(s) 103) and a mobile printing service platform (printing platform) 105. The printing platform 105 is configured to provide location and pricing information of the one or more print stations 103, and to provide for secure printing. According to certain embodiments, mobile devices may access the features and functionalities of printing platform 105 over one or more networks, such as data network 107, service provider network 109, telephony network 111, and/or wireless network 113, in order to provide secure mobile printing. For instance, the mobile device 101 can notify a user of the location of a print station 103 or the price for printing at each print station 103. Additionally (or alternatively), printing platform 105 may enable mobile devices 101 to securely transfer one or more files remotely with the ability to remotely select print and delivery options in order to, for example, select delivery location, identify packaging material (e.g., confidential envelope), select delivery service provider (e.g., USPS, FedEx, UPS), select type of delivery (e.g., expedited, next day). While specific reference will be made hereto, it is contemplated that system 100 may embody many forms and include multiple and/or alternative components and facilities.

It is observed that mobile device users who enjoy the ability to view and edit files on mobile devices typically use traditional means of locating a printer, determining price, and transferring files. Often these traditional means are facilitated via, for instance, a physical connection (e.g., media card or cable) when printing. Traditionally, when a user of a mobile device wished to print a file on the mobile device 101, the user manually determines printing locations and requests a price quote from each printing location; often times, many details for determining the printing quotes may not be readily available to the user (e.g., page number, number of color pages). Moreover, most attempts to transfer files remotely rely on e-mail or web based uploads unique to each printing location; however, once sent to the printing location, the documents may often have little or no means to ensure the confidentiality of the printed material. As a consequence, service providers are challenged to develop efficient techniques to remotely secure mobile printing, such as for the purpose of printing confidential material outside of a secured office.

Therefore, the approach of system 100, according to certain exemplary embodiments, stems from the recognition that consumers can benefit from a printing platform 105, whereby subscribers (or users) are given access to the printing platform 105 for locating one or more print stations 103, providing pricing, and enabling secure remote printing. For instance, users may access the printing platform 105 on a mobile device 101 for requesting the location of all print stations 103 in a target area. The printing platform 105 may determine the locations along with price data for all print stations 103 in the target area. Mobile devices 101 may also be given access to the printing platform 105 to securely transfer one or more files to a print station 103 in order to print documents and reduce unauthorized access to printed materials.

Accordingly, in some embodiments, system 100 facilitates locating print stations 103 using a target location set by, for instance, the printing platform 105, a value inputted into the mobile device 101, a location determined by location detection technology on the mobile device 101 or a wireless network 113 (e.g., cell sector, cell site triangulation). In a first embodiment, the target location is determined by the printing platform 105, by for example using a default value stored in a log. In a second embodiment, the target location is determined from reading an input into the mobile device 101, for example though a touch screen, or keyboard. It is noted that a mobile device 101 is described in more detail in accordance with FIG. 3. In a third embodiment, the target location is determined using location detection technology of the mobile device 101, for example GPS technology. The mobile device 101 may return spatial positioning information (e.g., an address, latitude, longitude, elevation, etc.) corresponding to a location of mobile device 101 as an input to the printing platform 105. In yet another embodiment, the location of mobile device 101 is determined using network information obtained from the service provider network 109, for example, cell sector identification.

Accordingly, mobile device 101 may be configured to determine corresponding spatial positioning information through conventional satellite positioning system (SPS) technology, such as GPS technology; however, any suitable navigational or location determination technology may be utilized, such as advanced forward link trilateration (A-FLT), assisted-GPS (A-GPS), enhanced cellular identification (CELL-ID), wireless area network (WLAN) positioning, etc. As is well known, SPS technology utilizes a constellation 115 of satellites that transmit signals to receivers (not shown) of, for example, one or more mobile devices 101, so that the receivers may determine corresponding spatial positions (or locations), speeds, directions, and/or timing for mobile devices 101. Mobile devices 101 may report this information to printing platform 105 to facilitate the determination of target print stations 103. It is also noted that printing platform 105 may "poll" or receive such spatial positioning information from mobile devices 101 in real-time, so as to provide presence service features related to mobile devices 101. As such, the location of, for instance, mobile device 101 may be detected without mobile device 101 having to initiate a phone call or other like communication session. Thus, printing platform 105 may be configured to present received and/or retrieved spatial positioning information to subscribers, such as via one or more GUI(s). It is also noted that spatial positioning information may be stored on printing platform 105 or any other suitable storage location or memory of (or accessible to) system 100.

In other instances, system 100 facilitates providing pricing data by determining print file characteristics (e.g., number of pages, print ink color). For example, the printing platform 105 may determine the file characteristics by reading file properties, or by reading the print file to determine the relevant characteristics.

Additionally, in some embodiments, system 100 facilitates secured printing by enabling subscribers (or users) to access the printing platform 105 via mobile device 101 in order to limit access to the print file and/or the printed material. For example, the mobile device 101 may send only print file characteristics to the printing platform 105. The printing platform 105 may generate, and send to the mobile device 101 authenticating information to enable access to printed material. By way of example, authenticating information may be transmitted to mobile devices 101 over one or more of networks 107-113, such as transmitted over one or more of networks 107-113 as part of one or more API 119 directed messages (e.g., API 119 short messaging service (SMS) directed messages). It is noted that the printing platform 105 is described in more detail in accordance with FIG. 2. In another embodiment, authenticating information may be used before printing the confidential file for the purpose of protecting sensitive information. Alternatively, the printed material may be generated and access restricted until the print station 103 receives authenticating information from a mobile device 101. Still further, the printing platform 105 may enable delivery of the printed material using secured packaging. The authenticating information may then be used to enable access to the printed material.

Alternatively, in some embodiments, system 100 facilitates the sending and receiving of status updates related to the printing. In one embodiment, the printing platform 105 may generate, and send to the mobile device 101 status updates regarding a print request. Status updates may include, for example, receipt of request to print, order confirmation, status of having printed material, status of having the printed material stored, status of generating printed material prepared for delivery, delivery item tracking, status of having the printed material out for delivery, status of attempt to access the printed material, status of access to printed material granted, delivery of printed material and a delivery receipt. Status updates may be transmitted to mobile devices 101 over one or more of networks 107-113 as part of one or more API 119 directed messages (e.g., API 119 short messaging service (SMS) directed messages). In another embodiment, a mobile web portal may be used for status updates and service administration. Access to the web portal may be provided based, at least in part, on authenticating information provided to the mobile device 101 by the printing platform 105.

It is noted that signals generated by, for example, authenticating information from printing platform 105 may be transmitted to mobile devices 101 via one or more of communication networks 107-113. To prevent unauthorized individuals from accessing printing platform 105, authenticating information may be required. Authenticating information may be any sequence of information transmitted in various forms including for example, audio, visual, or a combination thereof. In one example, authenticating information includes the detection of a code sequence input, such as a personal identification number (PIN), or user name password combination. In another example, authenticating information includes a visual indicator such as an optically machine-readable representation of data (e.g., barcode). In another example, authenticating information includes an audible indicator such as voice recognition. In another example, authenticating information includes a biometric indicator such as, fingerprint, face, DNA, palm print, hand geometry, hand vein geometry, iris, retina, voice print, odor, and scent recognition may be employed. In yet another example, authenticating information includes an electronic token transmitted (e.g., near field communication) by a security token such as hardware token, hardbad token, authentication token, USB token, cryptographic token, key fob, hardware dongle and software token. It is contemplated that mobile device 101 may be configured to enable use as a security token.

In some embodiments, any other means for preventing unauthorized access to print requests and related information may be used. Similarly, to prevent the implementation of unauthorized access, printing platform 105 may include an authentication identifier when transmitting signals to mobile devices 101. For instance, authenticating information may be encrypted, either symmetrically or asymmetrically, such that a hash value can be utilized to authenticate received control signals, as well as ensure that those signals have not been impermissibly alerted in transit. As such, communications between the mobile devices 101 and printing platform 105 may include various identifiers, keys, random numbers, random handshakes, digital signatures, and the like.

According to exemplary embodiments, mobile devices 101 may include one or more application protocol interfaces (API), such as a set of APIs included within, for example, a binary runtime environment for wireless (BREW) platform, for accepting input from the user. It is contemplated, however, that one or more other mobile client applications may be utilized, such as one or more applications written in one or more programming languages, such as C, C++, J2ME, Java, etc.

As seen in FIG. 1, service provider network 109 enables mobile devices 101 to access the features and functionality of printing platform 105 via one or more of networks 107, 111, and 113. Networks 107-113 may be any suitable wireline and/or wireless network. For example, telephony network 111 may include a circuit-switched network, such as the public switched telephone network (PSTN), an integrated services digital network (ISDN), a private branch exchange (PBX), or other like network. Wireless network 113 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 107 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 107-113 may be completely or partially contained within one another, or may embody one or more of the aforementioned infrastructures. For instance, service provider network 109 may embody circuit-switched and/or packet-switched networks that include facilities to provide for transport of circuit-switched and/or packet-based communications. It is further contemplated that networks 107-113 may include components and facilities to provide for signaling and/or bearer communications between the various components or facilities of system 100. In this manner, networks 107-113 may embody or include portions of a signaling system 7 (SS7) network, or other suitable infrastructure to support control and signaling functions. As such, the conjunction of networks 107-113 may be adapted to facilitate features and functionality of printing platform 105.

According to exemplary embodiments, mobile devices 101 may include any customer premise equipment (CPE) capable of sending and/or receiving information over one or more of networks 107-113. For instance, voice station 117 may be any suitable plain old telephone service (POTS) device, facsimile machine, etc., whereas mobile device 101 may be any cellular phone, radiophone, satellite phone, smart phone, wireless phone, or any other suitable mobile device, such as a personal digital assistant (PDA), pocket personal computer, tablet, customized hardware, etc. Even though only a limited number of mobile devices 101a-101n and print stations 103a-103n are illustrated, it is contemplated that system 100 can support a plurality of mobile devices 101, print stations 103, and equivalent devices. In addition, one or more functions described with the printing platform 105 may be performed by the mobile devices 101, the print stations 103, or other components of system 100. For example, it is contemplated that functions described with the printing platform 105 may be performed by a cloud located within, for example, the Service Provider Network 109.

Figure 2:
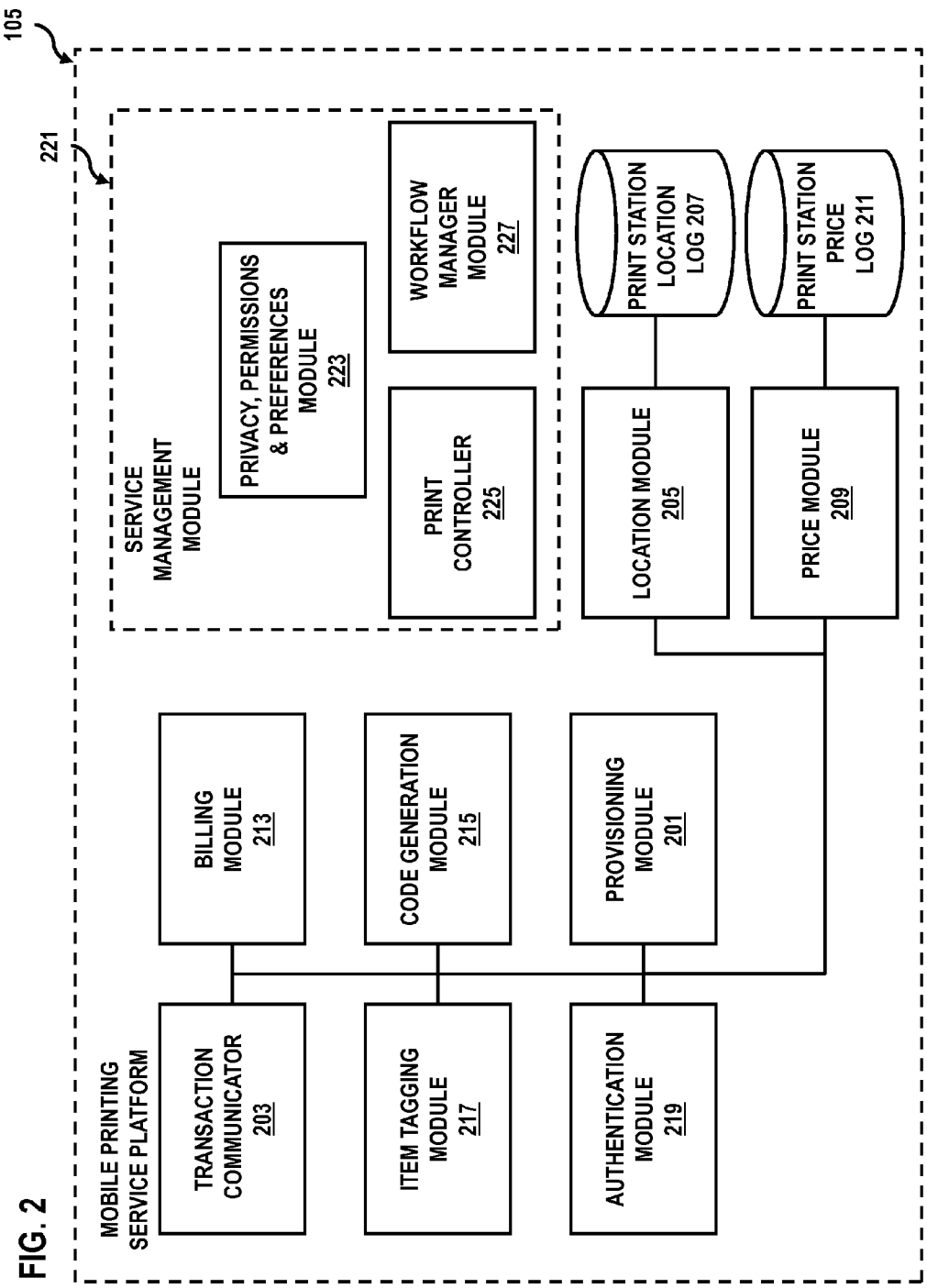
FIG. 2 is a diagram of the components of a mobile printing service platform, according to an exemplary embodiment.

FIG. 2 is a diagram of a printing platform 105 capable of providing secure mobile printing service, according to an exemplary embodiment. Printing platform 105 may comprise computing hardware (such as described with respect to FIGS. 10 and 11), as well as include one or more components configured to execute the processes described herein for providing the print station location and secure printing of system 100. In one implementation, printing platform 105 includes a provisioning module 201, transaction communicator 203, location module 205, print station location log 207, price module 209, print station price log 211, billing module 213, code generation module 215, item tagging module 217, authentication module 219, service management module 221, privacy, permissions and preferences module 223, print controller 225, and workflow manager module 227. In one embodiment, users may access printing platform 105 (or the features and functionality provided thereby) via mobile devices 101. While specific reference will be made to this particular implementation, it is also contemplated that printing platform 105 may embody many forms and include multiple and/or alternative components. For example, it is contemplated that the components of printing platform 105 may be combined, located in separate structures, or separate locations. Specifically, components of the printing platform 105 may be located in a mobile device 101, a service provider network 109 (e.g., service provider cloud) or in a print station 103.

According to one embodiment, printing platform 105 embodies one or more application servers accessible to mobile device 101 over one or more networks 107-113. Users (or subscribers) can access printing platform 105 to determine a print location (e.g., a print station 103) and price, to securely transfer a file, and/or to ensure secure access to printed material.

As seen in FIG. 2, printing platform 105 may include a provisioning module 201 for delivering mobile content to the mobile device 101. The provisioning module 201 may also update, for example, the version, language settings, or type of installation for the printing platform 105.

According to exemplary embodiments, printing platform 105 may include a transaction communicator 203 for sending and receiving information to and from the mobile device 101. For example, in one embodiment, the transaction communicator may receive print requests, print files, target locations, and user preferences from mobile device 101. Additionally, the transaction communicator 203 may send to the mobile device 101 the locations of target print stations 103, price, and/or status updates. The communication method may be, for instance, over the one or more networks 107-113 and may use a variety of communication methods in a single transaction. For example, CDMA or WiFi may be used to send the file to the print station 103; a location detection technology, such as GPS technology may be used to identify a location for determining target print stations; and SMS or MMS texting may be utilized to send status updates to the mobile device 101. In addition or alternatively, a mobile web portal may be used for status updates, and service administration.

According to exemplary embodiments, printing platform 105 may also include a location module 205 that may be used to determine print station locations and/or price information to print the request from the mobile device 101, and to update a print station location log 207 and a print station price log 211. It is contemplated that print station locations may be determined by various means. In one embodiment, the location module 205 may be configured to receive a target location from a mobile device 101. For instance, the target location may be a value inputted into the mobile device 101, a location determined by location detection technology on the mobile device 101 or a location detected by wireless network 113 (e.g., cell sector, cell site triangulation). The target location may be, for example, a zip code, address, and/or location coordinates such as latitude and longitude.

The location module 205 may then determine the target print station locations by, for example, first calculating a boundary from each print request using the target location and a preset range, and second by looking up each print station 103 in the print station location log 207 to determine if the print station 103 is within the calculated boundary. The preset range may be inputted from a user or may be defined by the printing platform 105. Alternatively, the location module 205 may first calculate a distance between the target location and the location of each print station 103 in the print station location log 207, and second determine which print stations 103 are within a distance of the preset range.

In another example, the print station location log 207 contains distance information, for example, a log of all print stations 103 within each zip code, and the location module 205 may look up the target print stations 103 in the print station location log 207 using the received location. The print station location log 207 may have one or more preset ranges from which the user to select and/or modify. In another embodiment, the mobile device 101 first determines and sends a calculated boundary to the location module 205, and second the location module 205 looks up the target print stations 103 in the print station location log 207 within the calculated boundary. It is contemplated that the mobile device 101 may be configured to contain a print station location log 207 and determine the target print station locations. The print station location log 207 may be updated by, for instance, the provisioning module 201.

Additionally, a print station price may be determined by a price module 209 by various means. In one embodiment, the price module 209 determines the price by receiving a print file, determining file printing factors used to calculate price, looking up cost factors in the print station price log 211 and calculating a price using the file printing characteristics and cost factors.

In one embodiment, file printing characteristics can affect the price of using the printing platform 105. For example, file printing characteristics include the number of pages, size of paper, packaging, time to perform job, the color of ink printed, and/or the like. Cost factors are used to adjust the price of using the printing platform 105, for example, a per page rate. In this manner, the price module 209 may determine cost by multiplying cost factors with the associated file printing characteristics. For example, the number of pages multiplied by the per page rate would result in a price. It is contemplated that one or more file printing characteristics and corresponding cost factors may be used to determine price. For example, a cost for page size may be added to a cost for the number of pages.

In another embodiment, the price is determined by the price module 209 which receives file printing characteristics sent from the mobile device 101, looks up the cost factors in the print station price log 211, and calculates a price using the file printing characteristics and cost factors. In some embodiments, price is determined by the mobile device 101. For example, the mobile device 101 determines the file printing characteristics used to calculate price and then receives cost factors from the price module 209 (e.g., from a print station price log 211). The mobile device 101 may calculate a price using the file printing characteristics and cost factors.

In yet another embodiment, price is determined by the mobile device 101 which determines the file printing characteristics used to calculate price, looks up the cost factors in a print station price log 211 and calculates a price using the file printing characteristics and cost factors. Additionally, a print station price log 211 on mobile device 101 may be updated, for example, by a provisioning module 201. The print station price log 211 may include pricing terms for various file printing factors, for example, the number of pages, size of paper, packaging, time to perform job, and the color of ink printed.

According to exemplary embodiments, printing platform 105 may also include a billing module 213 that may be used to bill the mobile device 101 for the printing service. The billing may be done by various means, for example, premium SMS based transactional payments, direct mobile billing, mobile web payments (WAP), contactless near field communication (NFC), credit card, online wallet and direct carrier/bank co-operation. The billing may occur in any step of the secure mobile printing and may allow for partial billing. For example, in a first embodiment the billing module 213 adds a charge for the printing service before the printing platform 105 generates authenticating information. In another embodiment, the billing module 213 adds a charge for the printing service at the start of printing printed material. In yet another embodiment, the billing module 213 adds a charge for the printing service before the printing platform 105 generates authenticating information and a second charge when a user is given access to the printed material. It is contemplated that the billing module 213 may integrate charges for the printing service to the billing associated with the mobile device 101. Additionally, the integrated billing may be itemized such that charges are easily understood.

In order to provide secure printing, printing platform 105 may also include a code generation module 215. It is contemplated that the code generation module may operate in concert with the item tagging module 217. That is, the code generation module 215 creates authenticating information that is used by the item tagging module 217. The code generation module 215 may save in a log (not shown) authenticating information generated or the authenticating information may be saved elsewhere. By way of example, the code may be any sequence of information, for example, numeric, alpha-numeric, dimensional barcode, or industry standard barcode (e.g., bookland EAN, ISSN, OPC, UPC shipping container symbol). The code generation module 215 may use various schemes to generate the code, for example, a random number table, a true random number generator, pseudo-random number algorithm such as the linear congruential generator, or a number based on probability density functions.

In this manner, the authenticating information may be used by an item tagging module 217 to associate each set of authenticating information with a print file and printed material. That is, the item tagging module 217 in one embodiment receives authenticating information and a print file and associates, for example, the print file, authenticating information, printed material, and packaging information. It is contemplated that the association can be achieved through a data storage table, by physical tagging, or a combination thereof. For example, in one embodiment, a cross-reference table is created to link all the print request information (e.g., the print file, printed material, packaging and storage location).

In another embodiment, a cross-reference table is used to link some of the information (e.g., the print file and authenticating information), and physical tagging is used to link some of the information (e.g., the printed material, and packaging). Physical tagging may be based, at least in part, on the authenticating information, or any other information. For example, a cross-reference table may link the print file, authenticating information and information linking it to a physical code stored on packaging. It is contemplated that any physical tagging may be used to associate, for example, numeric, alpha-numeric, dimensional barcode (e.g., QR code), or industry standard barcode (e.g., bookland EAN, ISSN, OPC, UPC shipping container symbol). It is contemplated that packaging can be used for various purposes, for example, physical protection, barrier protection, information transmission, marketing, security, or convenience. Additionally, the packaging may be of various types and include a number of features, for example, tamper resistance, tamper-evident, and anti-theft devices such as RFID tags, or electronic article surveillance.

In order to verify valid authenticating information, an authentication module 219 may be used to determine whether or not the information created by the code generation module 215 is sufficiently similar to information presented for validating authenticating information. For example, the information created by the code generation module 215 may be stored in various places, for example, the code generation module 215, the item tagging module 217, the authentication module 219, or a device located on the one or more networks 107-113. In one embodiment, the information presented for validating authenticating information may be sent from a print station 103, or from a mobile device 101. In another embodiment, the authenticating information presented for validating may be sent from a delivery device (e.g., a mobile device) used by a courier or mail service to confirm authorization to receive the printed material. It is contemplated that the method to obtain the authenticating information may be by any means, for example, optical/visual and audible methods such as a photodiode and light source, CCD reader, two-dimensional imaging scanner, omni-directional barcode scanner, voice print, biometric identification (e.g., fingerprint, hand geometry, hand vein geometry, iris, face recognition) and data transfer methods such as near-field communications, USB, SMS, MMS, and WiFi. It is contemplated that the authenticating information may be use in combination with or in lieu of a signature to receive delivery.

Additionally, printing platform 105 may include a service management module 221 for an improved user experience. The service management module includes a privacy, permissions and preferences module 223, a print controller 225, and a workflow manager module 227.

Accordingly, the privacy, permissions and preferences module 223 retains each user's options for privacy, permission and preferences. For example, a user may prefer that all printing be performed with a maximum security setting, while another may prefer a minimum security setting. The privacy, permissions and preferences module 223 may also allow a group or family access to documents within the group or family. Finally, user preferences may be retained for the user's convenience, for example, page layout, print ink color, number of copies, and print location. In one embodiment, default settings may be assumed and the information may be stored in various places, including for example, the privacy, permissions and preferences module 223, the service management module 221, the printing platform 105, on a device connected over the one or more networks 107-113, and/or on the user's mobile device 101.

Additionally, a print controller 225 may be included to ensure authorized access and quality printing. For example, the print controller 225 may hold printing until the authentication module 219 has verified authenticating information. Additionally, the print controller 225 may select a proper printer for the task (e.g., oversized printer for large sheets, color print for print outs requiring color printing). It is contemplated, that the print controller 225 may be located on a device connected over the one or more networks 107-113, for example, a print station 103, the mobile device 101, or the printing platform 105.

According to one embodiment, the service management module 221 includes a workflow manager module 227. The workflow manager module 227 may aid the mobile device 101 in selecting a print station 103 and provide status updates to the mobile device user. The workflow manager module 227 may coordinate with the price module 209, print station location log 207, and print station price log 211 to adjust the price, recommend a print station 103 for optimal workflow, and to notify the mobile device 101 of an expected availability time. For example, a workflow manager module 227 may adjust the price factors in the print station price log 211 to encourage equal use among multiple print stations 103, or may increase the price at a particular print station 103 that is near printing capacity. Alternatively, the workflow manager module 227 may monitor each print station's remaining printing capacity and recommend or offer an incentive to the user to select a print station with a relatively low printing use compared to the print station's maximum capacity.

In a another embodiment, the workflow manager module 227 may identify an expected time to prepare printed material and enable the user to consider alternative print stations 103 that can provide for a more expedited printing. The workflow manager module 227 may also send status updates to the mobile device 101 using the one or more networks 107-113. Status updates may include any information regarding a requested print job including, for example, an order confirmation, a delivery receipt, notifications of printing (e.g., generating printed material, storing printed material), notifications of delivery (e.g., preparing printed material for delivery, expected delivery time, delivery of printed material), and notifications of access to printed material (e.g., attempt to access the printed material, granting access to printed material).

In yet another embodiment, the workflow manager module 227 may send a location message associated with a print station 103 location to a mobile device 101 to enable a user to initiate directions to a print station 103. The location message may be sent at various times, for example, when selecting a target location, and when receiving authenticating information. The location message may include, for example, a zip code, address, and/or location coordinates such as latitude and longitude. The location message also may be configured to enable a user to initiate the display of directions on a mobile device 101 by, for example, selecting an icon or image.

In another embodiment, the workflow manager module 227 enables the deletion of print files after printed material has been generated. Whether or not to delete print files after printed material has been generated may be determined by, for example, a user's selection inputted into a mobile device 101, and a user preference stored in a privacy, permissions and preferences module 223.

Figure 3:
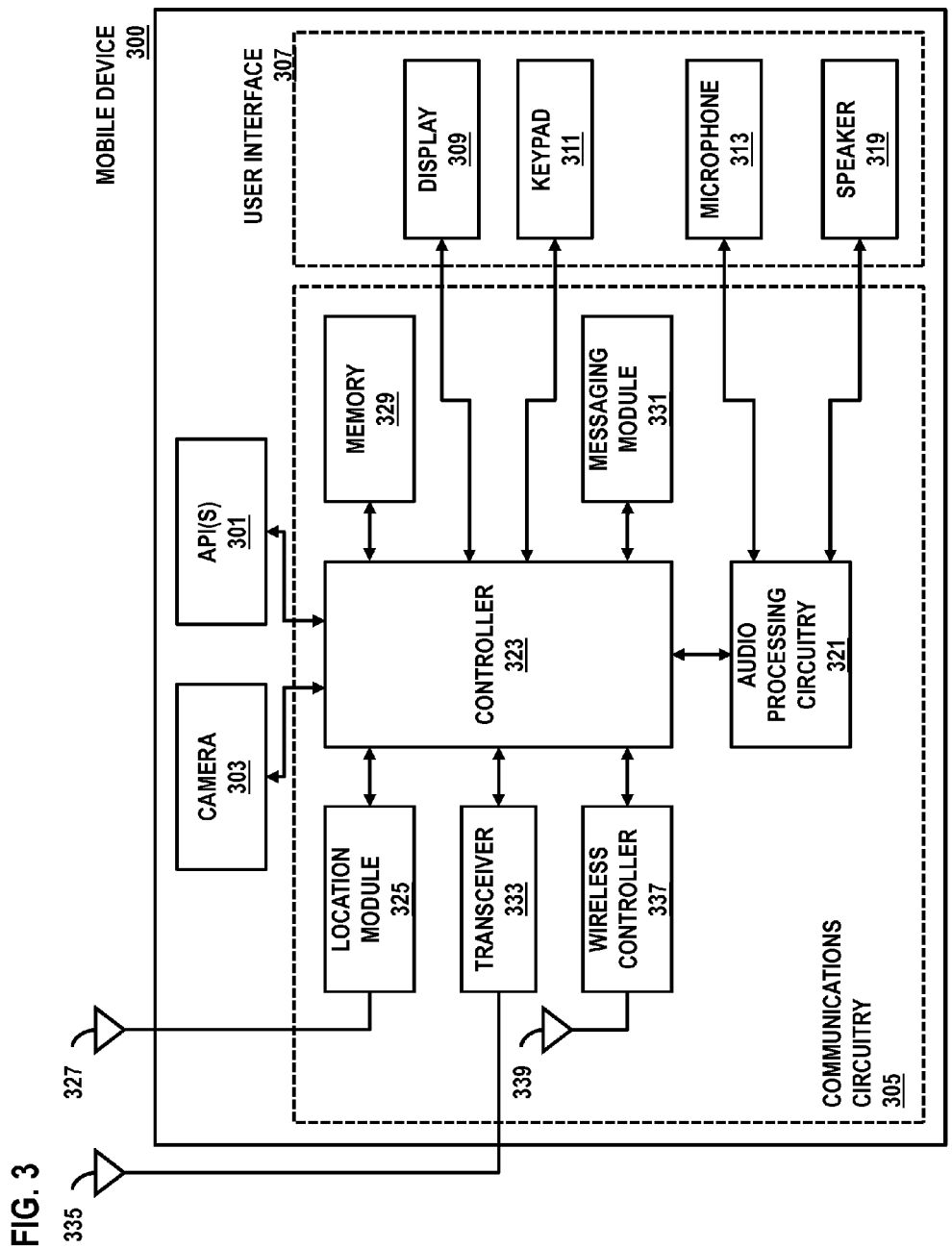
FIG. 3 is a diagram of a mobile device configured to facilitate securing mobile printing, according to an exemplary embodiment.

FIG. 3 is a diagram of a mobile device configured to facilitate secure mobile printing, according to an exemplary embodiment. Mobile device 300 (e.g., equivalent to the mobile device 101) may comprise computing hardware (such as described with respect to FIG. 10), as well as include one or more components configured to execute the processes described herein for facilitating the remote tracking services of system 100. In this example, mobile device 300 includes application programming interface(s) 301, camera 303, communications circuitry 305, and user interface 307. While specific reference will be made hereto, it is contemplated that mobile device 300 may embody many forms and include multiple and/or alternative components.

According to exemplary embodiments, user interface 307 may include one or more displays 309, keypads 311, microphones 313, and/or speakers 319. Display 309 provides a graphical user interface (GUI) that permits a user of mobile device 300 to view dialed digits, call status, menu options, and other service information. Specifically, the display 309 may allow viewing of, for example, authenticating information, and status updates. The GUI may include icons and menus, as well as other text and symbols. Keypad 311 includes an alphanumeric keypad and may represent other input controls, such as one or more button controls, dials, joysticks, touch panels, etc. The user thus can construct user profiles, enter commands, initialize applications, input remote addresses, select options from menu systems, and the like. Specifically, the keypad 311 may allow inputting of target location information, selecting print files and print stations, and confirming print requests. Microphone 313 converts spoken utterances of a user (or other auditory sounds, e.g., environmental sounds) into electronic audio signals, whereas speaker 319 converts audio signals into audible sounds. Similar to the displays 309, the speaker 319 may allow listening to, for example, authenticating information, and status updates. Likewise, the Microphone 313 may allow inputting of target location information, selecting print files and print stations, confirming print requests and detecting sounds to capture a transcript.

A Camera 303 may be used as an input device to, for example, collect data for a print file, and facilitate the selection of a print station location. The camera 303 may be used to create data files of visual images that can be used as print files. Additionally, the camera 303 may be used to facilitate the selection of a print station location by, for example, overlaying map information on a live direct view, or using the camera 303 to generate an augmented reality that may be viewed on Display 309. The augmented reality may be facilitated by the use of additional hardware such as micro electromechanical (MEMS) sensors such as accelerometers, solid state compasses, etc.

Communications circuitry 305 may include audio processing circuitry 321, controller 323, location module 325 (such as a GPS receiver) coupled to antenna 327, memory 329, messaging module 331, transceiver 333 coupled to antenna 335, and wireless controller 337 coupled to antenna 339. Memory 329 may represent a hierarchy of memory, which may include both random access memory (RAM) and read-only memory (ROM). Computer program instructions and corresponding data for operation can be stored in non-volatile memory, such as erasable programmable read-only memory (EPROM), electrically erasable programmable read-only memory (EEPROM), and/or flash memory. Memory 329 may be implemented as one or more discrete devices, stacked devices, or integrated with controller 323. Memory 329 may store information, such as one or more user profiles, one or more user defined policies, one or more contact lists, personal information, sensitive information, work related information, etc.

Additionally, it is contemplated that mobile device 300 may also include one or more applications and, thereby, may store (via memory 329) data associated with these applications for providing users with browsing functions, business functions, calendar functions, communication functions, contact managing functions, data editing (e.g., database, word processing, spreadsheets, etc.) functions, financial functions, gaming functions, imaging functions, messaging (e.g., electronic mail, IM, MMS, SMS, etc.) functions, multimedia functions, service functions, storage functions, synchronization functions, task managing functions, querying functions, and the like. As such, signals received by mobile device 300 from, for example, printing platform 105 may be utilized by API(s) 301 and/or controller 323 to facilitate locating print stations, and pricing options for utilizing the printing platform 105. It is also contemplated that these (or other) signals may be utilized by controller 323 to facilitate the secure transfer of a print file, for example from the mobile device 300 to the printing platform 105, and the secure transfer of authenticating information, for example to the mobile device 300.

Accordingly, controller 323 controls the operation of mobile device 300, such as in response to commands received from API(s) 301 and/or data stored to memory 329. Control functions may be implemented in a single controller or via multiple controllers. Suitable controllers 323 may include, for example, both general purpose and special purpose controllers and digital signal processors. Controller 323 may interface with audio processing circuitry 321, which provides basic analog output signals to speaker 319 and receives analog audio inputs from microphone 313.

It is noted that real time spatial positioning information may be obtained or determined via location module 325 using, for instance, satellite positioning system technology, such as GPS technology. In this way, location module 325 can behave as (or substantially similar to) a GPS receiver. Thus, mobile device 300 employs location module 325 to communicate with constellation 115 of satellites. These satellites transmit very low power interference and jamming resistant signals received by GPS receivers in the location module 325 via, for example, antennas 327. At any point on Earth, GPS receiver in location module 325 can receive signals from multiple satellites, such as six to eleven. Specifically, GPS receiver in location module 325 may determine three-dimensional geolocation (or spatial positioning information) from signals obtained from at least four satellites. Measurements from strategically positioned satellite tracking and monitoring stations are incorporated into orbital models for each satellite to compute precise orbital or clock data.

Accordingly, GPS signals may be transmitted over two spread spectrum microwave carrier signals that can be shared by GPS satellites, for example, satellites within constellation 115 of satellites. Thus, if mobile device 300 is able to identify signals from at least four satellite from, for example constellation 115, receivers may decode the ephemeris and clock data, determine the pseudo range for each satellite and, thereby, compute the spatial positioning of a receiving antenna 327. With GPS technology, mobile device 300 can determine its spatial position with great accuracy and convenience. It is contemplated, however, that location module 325 may utilize one or more other location determination technologies, such as advanced forward link triangulation (AFLT), angle of arrival (AOA), assisted GPS (A-GPS), cell identification (cell ID), observed time difference of arrival (OTDOA), enhanced observed time of difference (E-OTD), enhanced forward link trilateration (EFLT), network multi-path analysis, and the like. As such, a location module 325 can be utilized to determine the mobile device 300 location to facilitate identifying print stations near the mobile device 300. Many users stay near his or her mobile device 300, and in such cases the location module 325 may be utilized to find print stations near the user. It is also contemplated, that location determination technologies can predict a direction of travel by use of real time space positioning system technology to facilitate the locating print station locations near the user's intended travel path.

Mobile device 300 also includes messaging module 331 that is configured to receive, transmit, and/or process messages (e.g., Enhanced Messaging Service (EMS) messages, SMS messages, MMS messages, IM messages, electronic mail messages, and/or any other suitable message) received from (or transmitted to) printing platform 105 or any other suitable component or facility of system 100. As such, messaging module 331 may be configured to receive, transmit, and/or process print requests, pricing information, mobile device 300 and print station location information, terms of printing file, authenticating information and status updates. It is noted that print file, spatial positioning information, status updates, and device logs may be transmitted to printing platform 105 via transceiver 333 and/or wireless controller 337.

It is also noted that mobile device 300 can be equipped with wireless controller 337 to communicate with a wireless headset (not shown) or other wireless network. The headset can employ any number of standard radio technologies to communicate with wireless controller 337; for example, the headset can be Bluetooth enabled. It is contemplated that other equivalent short range radio technology and protocols can be utilized. While mobile device 300 has been described in accordance with the depicted embodiment of FIG. 3, it is contemplated that mobile device 300 may embody many forms and include multiple and/or alternative components.

Figure 4:
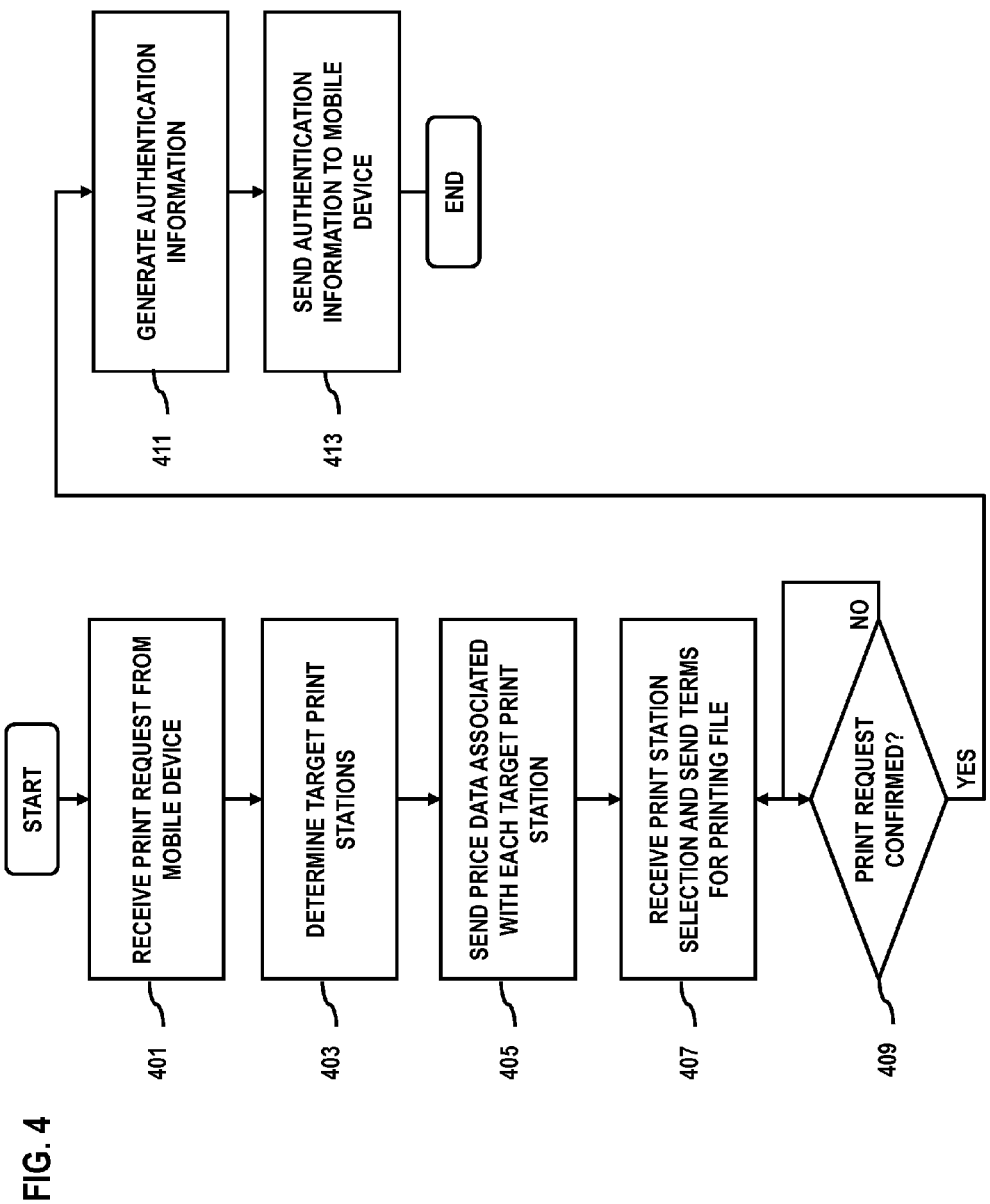
FIG. 4 is a flowchart of a process for requesting secure mobile printing and obtaining authorization to access the printed material from the perspective of a printing platform, according to an exemplary embodiment.

FIG. 4 is a flowchart of a process for requesting secure mobile printing and obtaining authorization to access the printed material from the perspective of a printing platform 105. For illustrative purposes, the process is described with respect to FIGS. 1, 2 and 3. It is noted that the steps of the process may be performed in any suitable order, as well as combined or separated in any suitable manner. In addition or alternatively, all or a portion of the process of FIG. 4 may be performed by the mobile device 101, the print stations 103, or a combination thereof.

At step 401, the printing platform 105 receives a request for secured mobile printing from mobile devices 101 to print stations 103 of system 100. The print request may include, for example, a print file, print characteristics, target location, printing time criteria, print file retention criteria, and requests for reoccurrence of generating print material.

According to one embodiment, the request may include a target location. The printing platform 105 may be configured to detect a user input into mobile device 101 to enable users to generate printed material near the location printed materials are used rather than near the location the print request is generated. For example, users may wish to print documents at their destination rather than carry printed material while traveling. Alternatively, printing platform 105 may be configured to detect the location of mobile device 101 using, for example, location detection technology in the mobile device 101 or network information (e.g., cell sector) obtained by the service provider network 109. Finally, a default location may be used from one or more sources, for example, mobile device 101, privacy, permissions and preferences module 223, or another device connected to the one or more networks 107-113.

According to another embodiment, the print request may also include time criteria for printed material availability. For example, printing platform 105 may be configured generate printed material at user specified time to enable delayed or timed printing. For example, printing platform 105 may be configured to enable a user specified delay in generating printed material. Likewise, printing platform 105 may be configured to enable the generation of printed material before a user specified time, or during a user specified window of time.

According to yet another embodiment, the print request may also include print file retention criteria. For example, printing platform 105 may be configured to enable a user to opt for the deletion of a print file once the printed material has been generated. Additionally, or alternatively, the printing platform 105 may be configured to securely retain print files after generation of printed material to enable the generation of additional printed material.

According to yet another embodiment, the print request may also include a request for reoccurrence of the generation of printed material. For example, printing platform 105 may be configured to enable a single print request to result in printed material generated at a plurality of instances (e.g., daily, weekly, monthly).

Once requested (or once the file to print has been received), printing platform 105 determines the target print stations. At step 403 either mobile device 101, the printing platform 105 or a combination thereof determines the target print stations 103. In one embodiment, the target print stations 103 are determined by the printing platform 105. Specifically, the location module 205 determines target print stations 103 using a target location sent from the mobile device 101, retrieved from a network (e.g., Service Provider Network 109), or a default target location. It is contemplated that default values, such as a default target location, or preset range may be determined by, for example, the service management module 221, the privacy, permissions and preferences module 223, the mobile device 101, or any other device connected to the one or more networks 107-113. The location module 205 determines a set of target print stations 103, for example using a target location, a preset target range and the locations of print stations 103. The preset range may be inputted from a user, defined by the printing platform 105, or may be a default value.

In one example, the location module 205 calculates a boundary for each print request using the received location and a preset range and looking up each print station location in a print station location log 207 and determining whether or not the print station 103 is located within the calculated boundary. In another example, the location module 205 may first calculate a distance between a received location and each print station 103 in the print station location log 207 and determine which print stations 103 are within a distance of a preset range. In yet another example, the print station location log 207 contains distance information, for example a list identifying print stations 103 within a preset range of each zip code, and the location module 205 reads the list identifying print stations 103 for the zip code identified in the target location sent by the mobile device 101. It is contemplated that the distance information contained in the print station location log 207 may be calculated by using any geographical system including for example, zip code, address and a specific coordinate system such as latitude and longitude. Furthermore, it is contemplated that the distance information contained in the print station location log 207 may allow for one or more preset values by containing for example, one or more lists that identify print stations 103 for a zip code. In this manner, multiple preset values may be supported.

In another embodiment, the mobile device 101 first determines and sends a calculated boundary to the location module 205, and second the location module 205 looks up the target print stations 103 within the calculated boundary. In some embodiments, the mobile device 101 contains a print station location log 207 and determines the target print station locations. The print station location log 207 on mobile device 101 may be updated by the provisioning module 201.

Once the printing platform 105 determines the target print station locations, it determines the price data associated with each target print station 103 and sends the price data mobile devices 101. At step 405, either mobile device 101, the printing platform 105 or a combination thereof determines the price data associated with each target print station 103 and sends the price data to the mobile device 101. In one embodiment, a price module 209 determines the price data by using file printing characteristics of the requested print file (e.g., number of pages, size of paper, packaging) and cost factors (e.g., price per page, price adjustment for size of paper, additional cost for packaging type per page). The file printing characteristics of the requested file may be determined, for example, by the mobile devices 101, by the printing platform 105, or by the price module 209. The cost factors of the requested print file may be located in a print station price log 211 which may be located, for example on mobile devices 101, or in the printing platform 105. In a second embodiment, the mobile device 101 determines the price data by using file printing characteristics of the requested print file (e.g., number of pages, size of paper, packaging) and cost factors (e.g., price per page, price adjustment for size of paper, additional cost for packaging type per page). The price data may be sent to the mobile device using the one or more networks 107-113.

Once the printing platform 105 determines the price data associated with each target print station 103 and sends the price data to mobile device 101, it receives a print station selection and sends the terms for printing the file. At step 407, the mobile devices 101 receives a print station selection from an input interface such as a keypad 311, or microphone 313 and the mobile device 101 sends a print selection to the printing platform 105, specifically, to the transaction communicator 203. It is contemplated that the user may opt not to select a print station 103 and the printing platform 105 may select a print station 103, or to use the location detection technology, in the mobile device may be used to select a print station, for example the closest print station 103 to the mobile device 101. Additionally, the communication method may be over the one or more networks 107-113.

Once the printing platform 105 receives a print station 103 selection and sends the terms for printing the file to the mobile devices 101, it requests a selection to either agree or disagree to printing terms. At step 409, the mobile device 101 receives a selection from an input interface such as a keypad 311, or microphone 313 and mobile device 101 sends the selection to the printing platform 105. In one embodiment, unless the user agrees to the terms by inputting an agreement to the printing terms on the mobile device 101 the printing platform 105 will take no further action.

Once the printing platform 105 receives agreement to terms for printing the file from the mobile devices 101, it generates authenticating information. At step 411, the printing platform 105, or more specifically the code generation module 215, creates authenticating information. The code generation module 215 may save in a log the authenticating information generated or the authenticating information may be saved elsewhere, for example on the service management module 221, on the printing platform 105, print stations 103 or any device connected to the one or more networks 107-113. The code generation may be any sequence of information, for example, numeric, alpha-numeric, dimensional barcode, or industry standard barcode (e.g., bookland EAN, ISSN, OPC, UPC shipping container symbol). The code generation module 215 may use various schemes to generate the code, for example, a random number table, a true random number generator, pseudo-random number algorithm such as the linear congruential generator, or a number based on probability density functions.

Once the printing platform 105 determines the authenticating information, it sends the authenticating information to mobile device 101. At step 413, mobile devices 101 that makes the print request in step 401 receives the authenticating information created in step 411 from printing platform 105, specifically, from the transaction communicator 203. It is contemplated that the communication method may be over the one or more networks 107-113 including for example MMS and SMS texting. Additionally, or alternatively, printing platform 105 may send a location message associated with a print station 103 location to a mobile device 101 to enable a user to initiate directions to a print station 103.

FIG. 5A is a flowchart of a process for requesting secure mobile printing and obtaining access to securely stored printed material from the perspective of a printing platform 105. For illustrative purposes, the process is described with respect to FIGS. 1 and 2. It is noted that the steps of the process may be performed in any suitable order, as well as combined or separated in any suitable manner. In addition or alternatively, all or a portion of the process of FIG. 5 may be performed by the mobile device 101, the print stations 103, or a combination thereof.

At step 501, the printing platform 105 receives a request for secured mobile printing from a mobile device 101. According to one embodiment, the request includes a print file from the mobile device 101.

Once the printing platform 105 receives a request for secured mobile printing from the mobile device 101 to print at print station 103 of system 100, it prints the request for secured mobile printing at print station 103 of system 100. At step 503, print station 103 of system 100 produces a physical representation (e.g., text, graphics, three dimensional objects) of documents stored in electronic form. It is contemplated that printing may be performed by various printing technologies, for example toner-based, liquid inkjet, thermal printers, solid ink printers and UV printers. The printing may utilize security printing features, for example, special paper, watermarks, color changing inks, security threads, anti-copying marks, and copy-evident paper. The printing may use a print controller 225 to select a proper printer for the task (e.g., oversized printer for large sheets, color print for print outs requiring color printing). It is contemplated, that the print file may be deleted once the printed material has been generated.

Once the printing platform 105 prints the request for secured mobile printing at print station 103 of system 100, it tags and packaging the printed material for pickup by a user with valid authenticating information. At step 505, the printed material is associated with the authorizing information of the print file used to print the printed material and the printed material may be placed inside a package. For example, the authenticating information may be used by an item tagging module 217 to associate each set of authenticating information with a print file and printed material. That is, the item tagging module 217 in one embodiment receives authenticating information and a print file and associates the print file, authenticating information, printed material, and packaging information. It is contemplated that association can be achieved through a data storage table, by physical tagging or a combination thereof. In one embodiment a cross-reference table is created to link all the information, for example, the print file, printed material storage location, packaging and storage location. In a second embodiment, a cross-reference table is used to link some of the information, for example the print file and authenticating information, and physical tagging is used to link some of the information, for example the printed material, and packaging. In this manner, the physical tagging may facilitate a courier or mail delivery service. Physical tagging may be the authenticating information, or any other information. For example, the cross-reference table may link the user file, authenticating information and information linking it to a physical code stored on packaging. It is contemplated that any physical tagging may be used to associate, for example, numeric, alpha-numeric, dimensional barcode (e.g., QR code), or industry standard barcode (e.g., bookland EAN, ISSN, OPC, UPC shipping container symbol). It is contemplated that packaging can be used for various purposes, for example, physical protection, barrier protection, information transmission, marketing, security, or convenience. Additionally, the packaging may be of various types and include a number of features, for example, tamper resistance, tamper-evident, and anti-theft devices such as RFID tags, or electronic article surveillance.

Once the printing platform 105 tags and packaging the printed material for pickup by a user with valid authenticating information, it prevents unauthorized access to the printed material. In a first embodiment of step 507, the printed material, is transported into a container designed to prevent unauthorized access. It is contemplated that the container may have a variety of security features, including physical features, such as burglar, fire, environmental resistance, electronic lock, and transactional features, such as the use of a secure cryptoprocessor, and data encryption. Furthermore, electronic monitoring may be used to provide additional security. In a second embodiment of step 507 the printed material is tendered to a courier or mail delivery service that requires valid authenticating information prior to granting access to the printed material.

Once the printing platform 105 securely stores the printed material, it waits until authenticating information is received. At step 509, the printing platform 105 receives authenticating information. In one embodiment, the authenticating information received may be sent from a print station 103, from a mobile device 101, or any other device connected to the one or more networks 107-113. In another embodiment, the authorizing information presented may be sent from a delivery device (e.g., a mobile device) used by a courier or mail service to confirm authorization to receive the printed material. It is contemplated that the method to obtain the code may be by any means, for example, optical/visual and audible methods such as a photodiode and light source, CCD reader, two-dimensional imaging scanner, omni-directional barcode scanner, voice print, biometric identification (e.g., fingerprint, hand geometry, hand vein geometry, iris, face recognition) and data transfer methods such as near-field communications, USB, SMS, MMS, and WiFi.

Once the printing platform 105 receives authenticating information, it determines whether or not the authenticating information is valid. At step 511, an authentication module 219 may be used to determine whether or not the information created by the code generation module 215 is sufficiently similar to authenticating information presented for validating authorization. It is contemplated that the information created by the code generation module 215 may be stored in various places, for example, by a code generation module 215, an item tagging module 217, an authentication module 219, or a device (not shown) connected to the one or more networks 107-113.

Once the printing platform 105 determines the authenticating information is valid, it provides access of the printed material to the user presenting the valid authenticating information. At step 513, the printed material previously securely stored in step 507 is made accessible to the user providing the valid authenticating information in step 509. In one embodiment, a container designed to prevent unauthorized access is manipulated by the printing platform 105 to allow the user presenting valid authenticating information access to the printing material associated with the authenticating information. It is contemplated that the user may be given directions on the location and how to retrieve on the mobile device 101, or print station 103. In a second embodiment, a courier or mail delivery service grants the delivery recipient access to the printed material, for example tendering the package containing the printed material to the delivery recipient presenting valid authenticating information access to the printing material associated with the authenticating information.

In one embodiment, the print station 103 has a transparent portion that allows users to see one or more actions performed by the print station 103. Specifically, print station 103 may be configured to enable the exposing of electromechanical functioning of the print station 103 so that users can observe its operation. That is, print station 103 may be configured to enable automation where one or more actions are performed by the print station 103 is visible to one or more users.

Once the printing platform 105 provides access of the printed material to the user presenting the valid authenticating information, it generates a notification of successful retrieval. At step 515, the printing platform 105 generates and sends the mobile device 101 that requested secured mobile printing notification of successful retrieval using the one or more networks 107-113. It is contemplated that the printing platform 105 may provide various status updates at any step in the process including, for example, order confirmation, printing status, secure storage status, delivery status, access attempt status, access granted status, and a written acknowledgment of completion of services such as a receipt or invoice.

Alternatively, if the printing platform 105 receives invalid authenticating information it may continue to restrict access of the printed material to the user presenting the invalid authenticating information, and generate a notification of access attempt. At step 517, the printing platform 105 generates and using the one or more networks 107-113 sends the mobile device 101 that requested secured mobile printing notification of a failed access attempt. It is contemplated that printing platform 105 may provide further information, such as, for example, location, time, and identifying characteristics of the user presenting the invalid authenticating information. Additionally, the printing platform 105 may provide the mobile device 101 that requested secured mobile printing additional options, for example, to allow access of the printed material to the user presenting the invalid authenticating information, further restrict access (e.g., restrict all access to the printed material for a specified time period) or to contact the mobile device 101 presenting the invalid authenticating information.

Figure 5B:
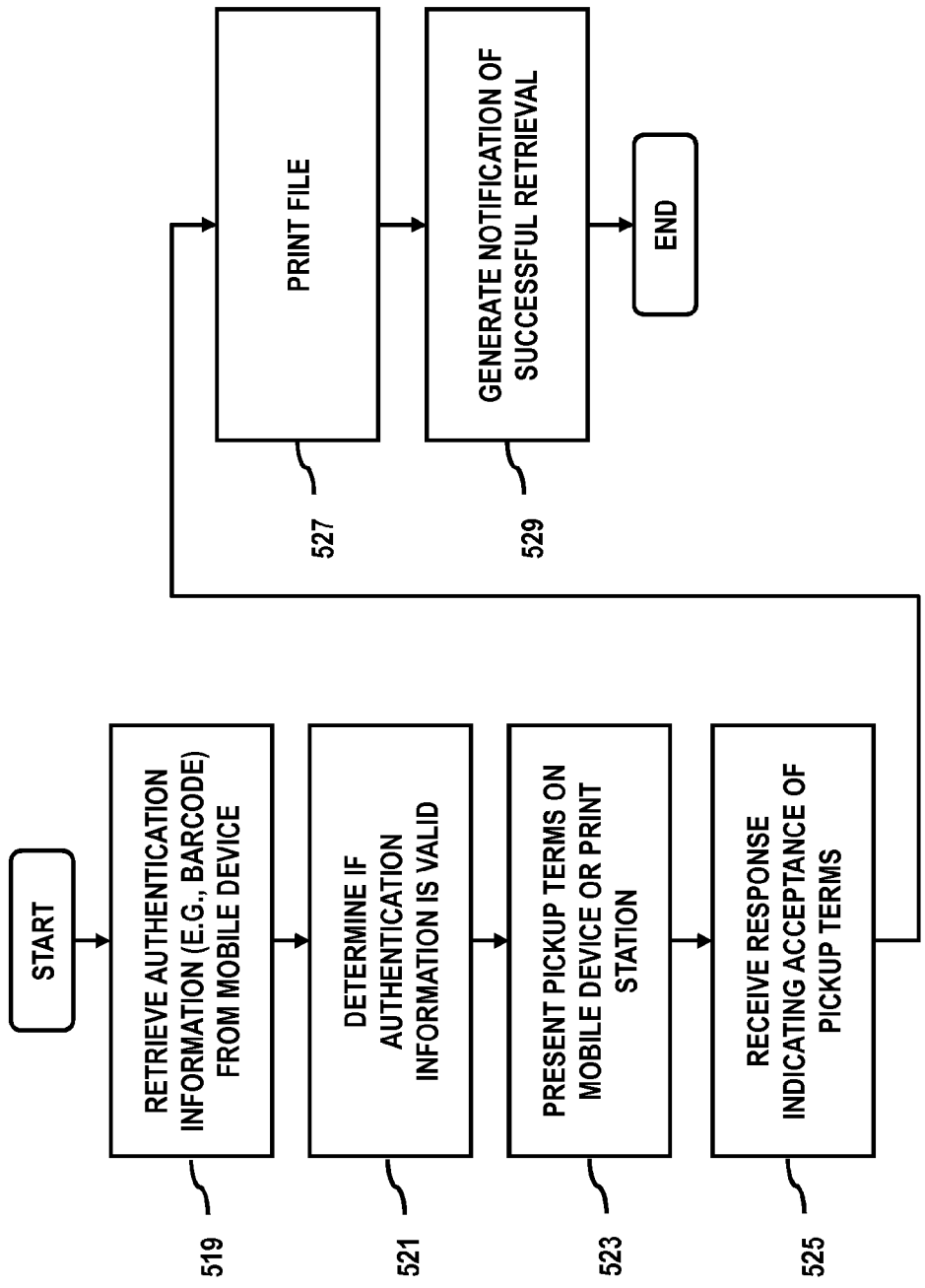
FIG. 5B is a flowchart of a second process for handling a request to access the printed material for secured mobile printing, according to an exemplary embodiment.

FIG. 5B is a flowchart of an alternative process for requesting secure mobile printing and obtaining access to securely stored printed material from the perspective of a printing platform 105. For illustrative purposes, the process is described with respect to FIGS. 1 and 2. It is noted that the steps of the process may be performed in any suitable order, as well as combined or separated in any suitable manner. In addition or alternatively, all or a portion of the process of FIG. 5 may be performed by the mobile device 101, the print stations 103, or a combination thereof.

At step 519, the printing platform 105 receives authenticating information from a user presenting the authenticating information. In one embodiment, the authenticating information received may be sent from a print station 103, from mobile device 101, or a device (not shown) connected to the one or more networks 107-113. It is contemplated that the method to obtain the code may be by any means, for example, optical/visual and audible methods such as a photodiode and light source, CCD reader, two-dimensional imaging scanner, omni-directional barcode scanner, voice print, biometric identification (e.g., fingerprint, hand geometry, hand vein geometry, iris, face recognition) and data transfer methods such as near-field communications, USB, SMS, MMS, and WiFi.

Once the printing platform 105 receives authenticating information, it determines whether or not the authenticating information is valid. At step 521, an authentication module 219 may be used to determine whether or not the authenticating information created by the code generation module 215 and sent to the mobile device 101 requesting printing is sufficiently similar to authenticating information presented for validating authorization. It is contemplated that the information created by the code generation module 215 may be stored in various places, for example, by the code generation module 215, the item tagging module 217, or the authentication module 219, or any other device connected to the one or more networks 107-113.

Once the printing platform 105 determines that the authenticating information is valid, it sends the pickup and/or delivery terms to a mobile device 101. At step 523, the printing platform 105, and in one embodiment, the transaction communicator 203 sends the mobile device 101 confirmation terms. Namely, the user may interact with an input interface (e.g., a keyboard, interactive voice response (IVR) interface, etc.) of, for example, mobile device 101 to agree to the pickup terms, such as a GUI or other networked application that interfaces with (or is implemented by) printing platform 105.

Once the printing platform 105 sends the printing terms to the mobile devices 101, it receives a response indicating acceptance of pickup terms from the mobile device 101. At step 525, the mobile device 101 receives a selection from an input interface such as a keypad 311, or microphone 313 and mobile device 101 indicating agreement to the pickup terms and the printing platform 105, specifically, the transaction communicator 203 receives the acceptance through the one or more networks 107-113 shown on FIG. 1. For example, the printing platform 105 may take no further action unless the user agrees to the terms by inputting an agreement to the printing terms on the mobile device 101. In one embodiment, the user requesting printing must agree to the pickup terms. In a second embodiment, the user presenting authenticating information must agree to the pickup terms.

Once the printing platform 105 receives a response indicating acceptance of pickup terms from the mobile device 101, it prints the request at print station 103 of system 100. At step 527, the print station 103 of system 100 produces a physical representation (e.g., text, graphics, three dimensional objects) of documents stored in electronic form. It is contemplated that printing may be performed by various printing technologies, for example toner-based, liquid inkjet, thermal printers, solid ink printers and UV printers or 3D printers. The printing may utilize security printing features, for example, special paper, watermarks, color changing inks, security threads, anti-copying marks, and copy-evident paper. The printing may use a print controller 225 to select a proper printer for the task (e.g., oversized printer for large sheets, color print for print outs requiring color printing). It is contemplated, that the print file may be deleted once the printed material has been generated. Additionally, it is contemplated that the print station 103 has a transparent portion that allows users to see one or more actions performed by the print station 103. Specifically, the capability of exposing electromechanical functioning of the print station so that users can observe its operation. This may allow for print station automation where one or more actions are performed by the print station 103 is visible to one or more users.

Once the printing platform 105 prints the request at print station 103 of system 100, it generates a notification of successful retrieval. At step 529, the printing platform 105 generates and sends the mobile device 101 that requested secured mobile printing notification of successful retrieval using the one or more networks 107-113. It is contemplated that the printing platform 105 may provide various status updates at any step in the process including, for example, order confirmation, printing status, secure storage status, delivery status, access attempt status, access granted status, and a written acknowledgment of completion of services such as a receipt or invoice.

Figure 6:
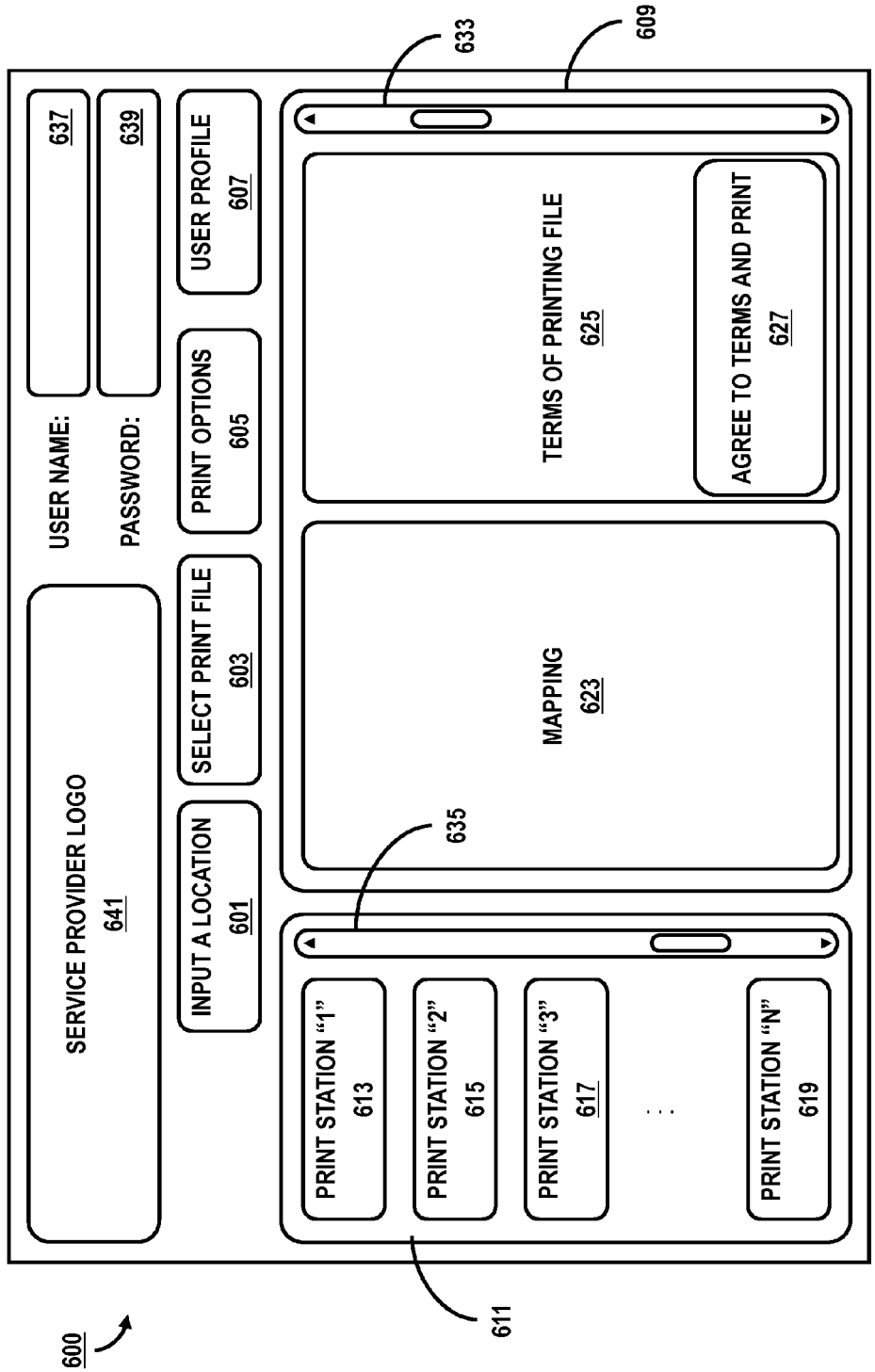
FIG. 6 is a graphical user interface for secure mobile printing, according to an exemplary embodiment.

FIG. 6 is a graphical user interface for secure mobile printing, according to an exemplary embodiment. In this example, it is assumed that GUI 600 is provided to a subscriber of the secure mobile printing services of system 100 by printing platform 105 via, for instance, provisioning module 201. It is also assumed that the subscriber has registered one or more mobile devices 101, with the secure mobile printing services of system 100. Hence, GUI 600 includes a plurality of "tabs" (or interactive interface elements), e.g., "INPUT A LOCATION" tab 601 "SELECT PRINT FILE" tab 603, "PRINT OPTIONS" tab 605, and "USER PROFILE" tab 607 provides the subscriber with various "main" secure mobile printing features or functionalities of printing platform 105. For instance, tab 601 enables the subscriber to input a location, or to use a location detection system. Tab 603 enables the subscriber to identify a print file. Tab 605 enables subscribers to select printing options (e.g., number of copies, ink color, etc.). Tab 607 enables subscribers to modify corresponding user profile information, such as user default information to the secure mobile printing services of system 100, update personal information, and the like.

Accordingly, selection of tab 603 (or any other suitable interaction with) toggles region 609 to an "active" select print file region 609, providing a file listing of printable information. For instance, selection of tab 605 toggles "active" print options region 609. In other embodiments, print station locations region 611 may include a navigation tree, an expandable table of contents, or for example FlashMedia presentation of selectable entries, as well as other equivalent listings, menus, options, etc. The content of respective regions (e.g., regions 609 and 611) may be dynamically updated based on one or more selections of a print station location tab, for example tab 613, tab 615, tab 617, and tab 619.

Accordingly, selection of a print station location tab 613 provides spatial positioning information (e.g., a "current" location) of the print station, which in this example is "PRINT STATION '1.'" As such, a "'MAPPING" region 623 may be provided that overlays the spatial positioning information on, for instance, a topological depiction of a geographic area surrounding the location of the device, which may also be appended with various cartographic features, such as buildings, landmarks, roadways, signs, and the like. In certain embodiments, the overlay may be a point-of-interest (POI) marker, such that the subscriber may obtain directions to the location of the device via interaction with the POI marker. Additionally, terms of printing at the selected location under tab 601 the selected file under tab 603 are displayed on a "TERMS OF PRINTING FILE" region 625. Interaction with tab 627 enables the subscriber to print the selected print file under tab 603 at the inputted location under tab 601 under the terms of printing displayed on region 625.

Navigational elements/fields, e.g., scrollbars 633 and 635, may be provided and configured to indicate the existence of additional information, entries, fields, etc., not displayed, but navigably available, as well as facilitate interface usability. Accordingly, the subscriber may browse to additional information, entries, and/or fields.

According to additional exemplary embodiments, GUI 600 may include various other regions, such as a user name region 637 and a password region 639 for enabling subscribers to "log on" and obtain access to the features and functionalities of GUI 600 and/or printing platform 105. In alternative embodiments, regions 637 and 639 may be configured to correspond to other associated authenticating information. It is noted that a "WELCOME, USERNAME" message may be presented to authenticated subscribers once sufficient authentication (or authorization) information is input to regions 637 and/or 639. Still further, GUI 600 may include a service provider logo region 641 to illustrate (or otherwise present) the subscriber with a logo of the service provider of the secure mobile printing of system 100, as well as include other suitable (or equivalent) regions, such as an advertisement region (not shown), etc.

Figure 7:
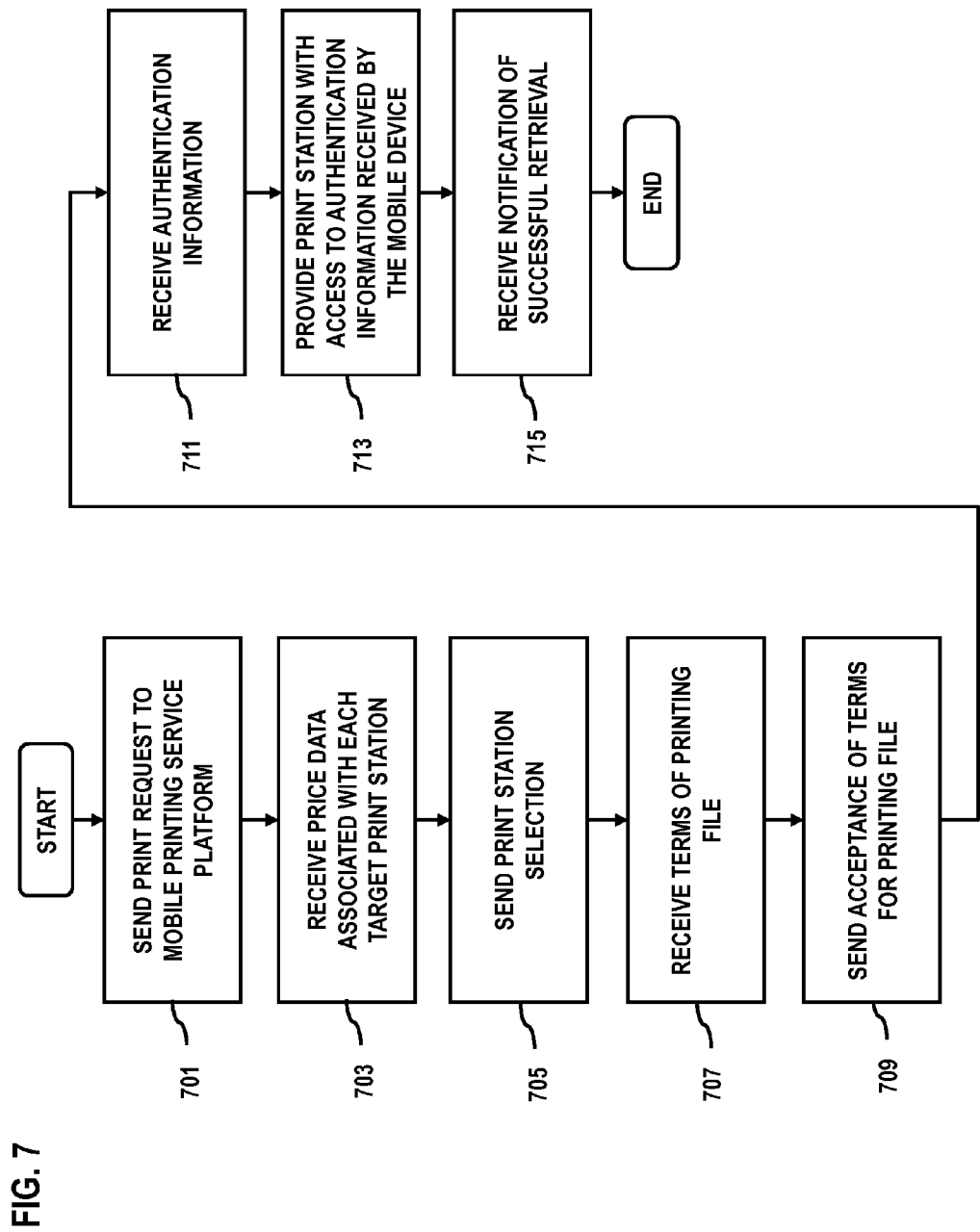
FIG. 7 is a flowchart of a process for a mobile device user obtaining secured mobile printing, according to an exemplary embodiment.

FIG. 7 is a flowchart of a process for requesting secure mobile printing and obtaining access to securely stored printed material from the perspective of a mobile device 101. For illustrative purposes, the process is described with respect to FIGS. 1 and 2. It is noted that the steps of the process may be performed in any suitable order, as well as combined or separated in any suitable manner.

At step 701, the mobile device 101 makes a print request to printing platform 105. The transaction communicator 203 may facilitate the communication between printing platform 105 and the mobile device 101. It is contemplated that the communication method may be over the one or more networks 107-113 including for example Internet protocol (IP) messages, MMS and SMS texting. It is contemplated that the print request may include a simple inquiry to the availability of secure mobile printing services, and may also include a print file, print file characteristics, and/or information regarding a target location for print pickup or delivery. Further, the print request may include various additional preferences associated with a print request, for example, delayed or time printing, and file retention, and recurrence printing.

The print file may be in various file formats, for example, RAW, JPG, DOC, DOCX, ODM, ODT, OTT, TXT, RTF, PDF, PAGES, PLT, EPS, HPGL, DXF, DWG, SNP, Gerber formats. Furthermore, it is contemplated that the file characteristics may include a variety of factors such as, for example, the number of pages, type of ink (e.g., color or black), size of paper, type of packaging, time to print, location of printing services, and post-printing processing (e.g., stapling, binding, punching). It is contemplated that the print file may be in the form of an audio or video file to, for example, generate printed material of a series of images representing a video and to capture a transcript of audio.

In one embodiment, if no location information is inputted a location detection technology, such as GPS technology may provide a target location, or a cell sector determined by network information (e.g., Service Provider network 109), or alternatively a default location may be used. A default location may be from one or more sources, for example, the mobile device 101, the privacy, permissions and preferences module 223, or a device (not shown) connected to the one or more networks 107-113.

Once the mobile device 101 makes a print request to printing platform 105, it receives the price data associated with each target print station 103. At step 703 the mobile device 101, the printing platform 105 or a combination thereof determines the price data associated with each target print station 103 and the price data is accessible to the mobile device 101. In one embodiment, a price module 209 determines the price data by using print file characteristics of the requested print file (e.g., number of pages, size of paper, packaging) and cost factors (e.g., price per page, price adjustment for size of paper, additional cost for packaging type per page). The print file characteristics of the requested file may be determined, for example, by the mobile device 101, by the printing platform 105, or by the price module 209. The cost factors of the requested print file may be located, for example, in a print station price log 211 which may be located, for example on the mobile device 101, or in the printing platform 105. In a second embodiment, the mobile device 101 determines the price data by using print file characteristics of the print file (e.g., number of pages, size of paper, packaging) and cost factors (e.g., price per page, price adjustment for size of paper, additional cost for packaging type per page). It is contemplated that the mobile device 101 can be updated with, for example, changes to cost factors, price data and print station locations by printing platform 105, or a provisioning module 201 through the one or more networks 107-113 shown on FIG. 1.

Once the mobile device 101 receives the price data associated with each target print station 103, it sends a print station selection to the printing platform 105. At step 705, the mobile devices 101 receives a selection from an input interface such as a keypad 311, or microphone 313 of a print station selection and the mobile device 101 sends a print selection to the printing platform 105. Namely, the user may interact with an input interface (e.g., a keyboard, touchscreen, interactive voice response (IVR) interface, etc.) of, for example, mobile device 101 to select a location, such as a GUI or other networked application that interfaces with (or is implemented by) printing platform 105. The inputted target location may enable users to print printed material near the location where the printed material is used. For example, users may wish to print documents at their destination rather than carry printed material while traveling. It is contemplated that the user may opt to not select a print station and the printing platform 105 may select a print station, or to use the location detection technology, in the mobile device 101 may be used to select a print station, for example the closest print station to the mobile device 101. A default location may also be used one or more sources, for example, the mobile device 101, the privacy, permissions and preferences module 223, or a device (not shown) connected to the one or more networks 107-113. Additionally, the communication method may be over the one or more networks 107-113 and may use a transaction communicator 203 shown in FIG. 2.

Once the mobile device 101 sends a print station selection to the printing platform 105, it receives pickup and/or delivery terms for the resulting printed materials. At step 707, the printing platform 105 sends the mobile device 101 confirmation terms and the mobile device 101 views the pickup terms on the display 309.

Once the mobile device 101 receives pickup terms, it sends a response indicating acceptance of pickup terms from mobile device 101. At step 709, the mobile device 101 receives a selection from an input interface such as a keypad 311, or microphone 313 indicating the user's agreement to the pickup terms and the mobile device 101 sends the acceptance through the one or more networks 107-113 shown on FIG. 1. For example, the printing platform 105 may take no further action unless the user agrees to the terms by inputting an agreement to the printing terms on the mobile device 101.

Once the mobile device 101 sends a response indicating acceptance of pickup terms from mobile device 101, it receives authenticating information. At step 711, mobile device 101 receives the authenticating information created by the printing platform 105. It is contemplated that the communication method may be over the one or more networks 107-113 including for example MMS and SMS texting. The code generation may be any sequence of information, for example, numeric, alpha-numeric, dimensional barcode, or industry standard barcode (e.g., bookland EAN, ISSN, OPC, UPC shipping container symbol). Additionally, or alternatively, mobile device 101 may receive a location message associated with a print station 103 location to enable a user to initiate directions to a print station 103.

Once the mobile device 101 receives authenticating information, it allows the user to provide access to the authenticating information. At step 713, the mobile device 101 allows access to the authenticating information to, for example, print station 103 to retrieve a secure document or to print an electronic file, or a mobile device 101 to aid a courier or mail service to verify authenticating information prior allowing access of printed material. In a first embodiment, the mobile device 101 that made the print request in step 701, and received the authenticating information in step 711, also sends the authenticating information to a print station 103. In a second embodiment, the mobile device (e.g., mobile device 101a) sends the authenticating information to a second mobile device (e.g., mobile device 101b) and the second mobile device provides access to the authenticating information. It is contemplated that the method to send the code may be by any means, for example, optical/visual and audible methods such as a photodiode and light source, CCD reader, two-dimensional imaging scanner, omni-directional barcode scanner, voice print, biometric identification (e.g., fingerprint, hand geometry, hand vein geometry, iris, face recognition) and data transfer methods such as near-field communications, USB, SMS, MMS, and WiFi. Once the user provides authenticating information the printing platform may allow the user access to printed material.

Once the mobile device 101 enables the user to provide access to the authenticating information, it receives a notification of successful retrieval. At step 715, the printing platform 105 generates and sends the mobile device 101 that requested secured mobile printing notification of successful retrieval using the one or more networks 107-113. It is contemplated that mobile device 101 may receive status updates at any step in the process including, for example, order confirmation, printing status, secure storage status, delivery status, access attempt status, access granted status, and a written acknowledgment of completion of services such as a receipt or invoice.

Figure 8A:
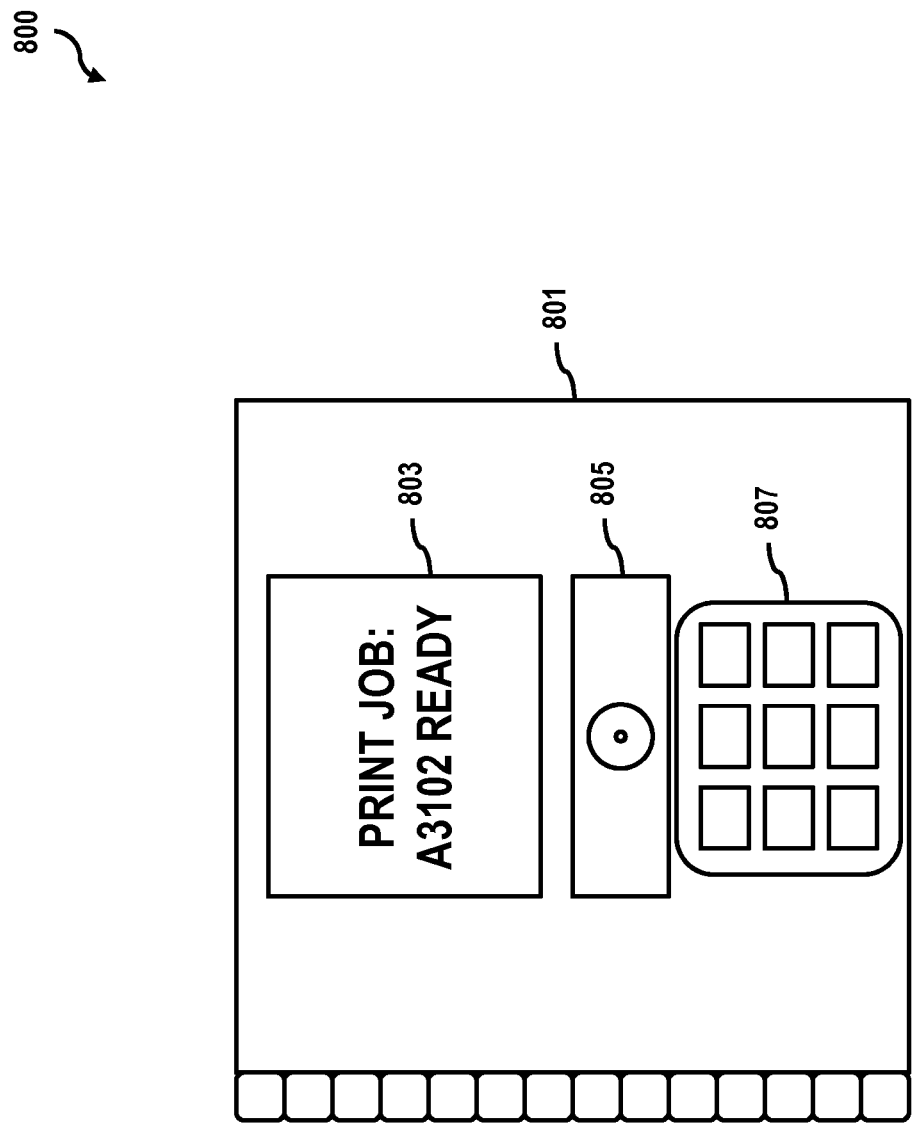
FIGS. 8A, 8B, 8C, and 8D are illustration of one embodiment for securing printed material.
Figure 8B:
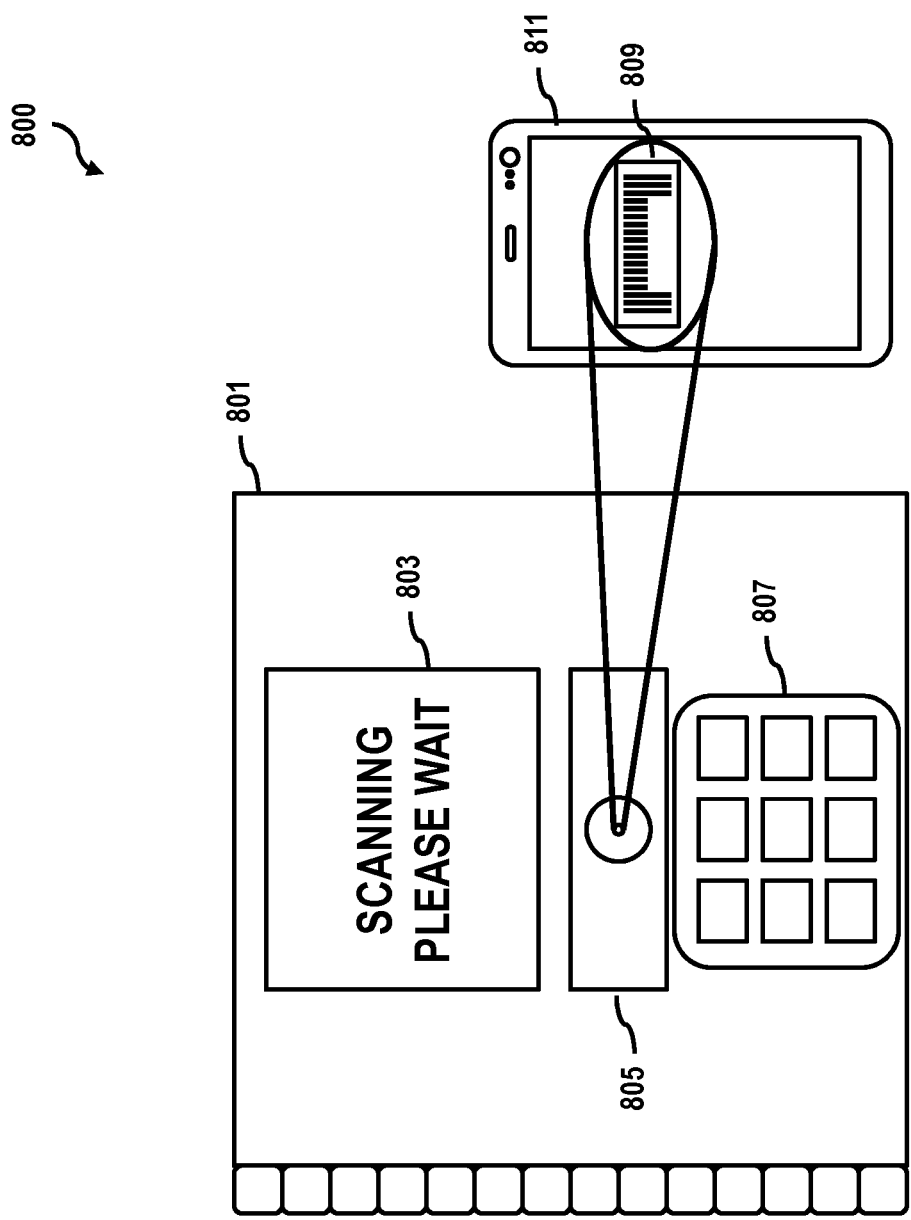
Figure 8C:
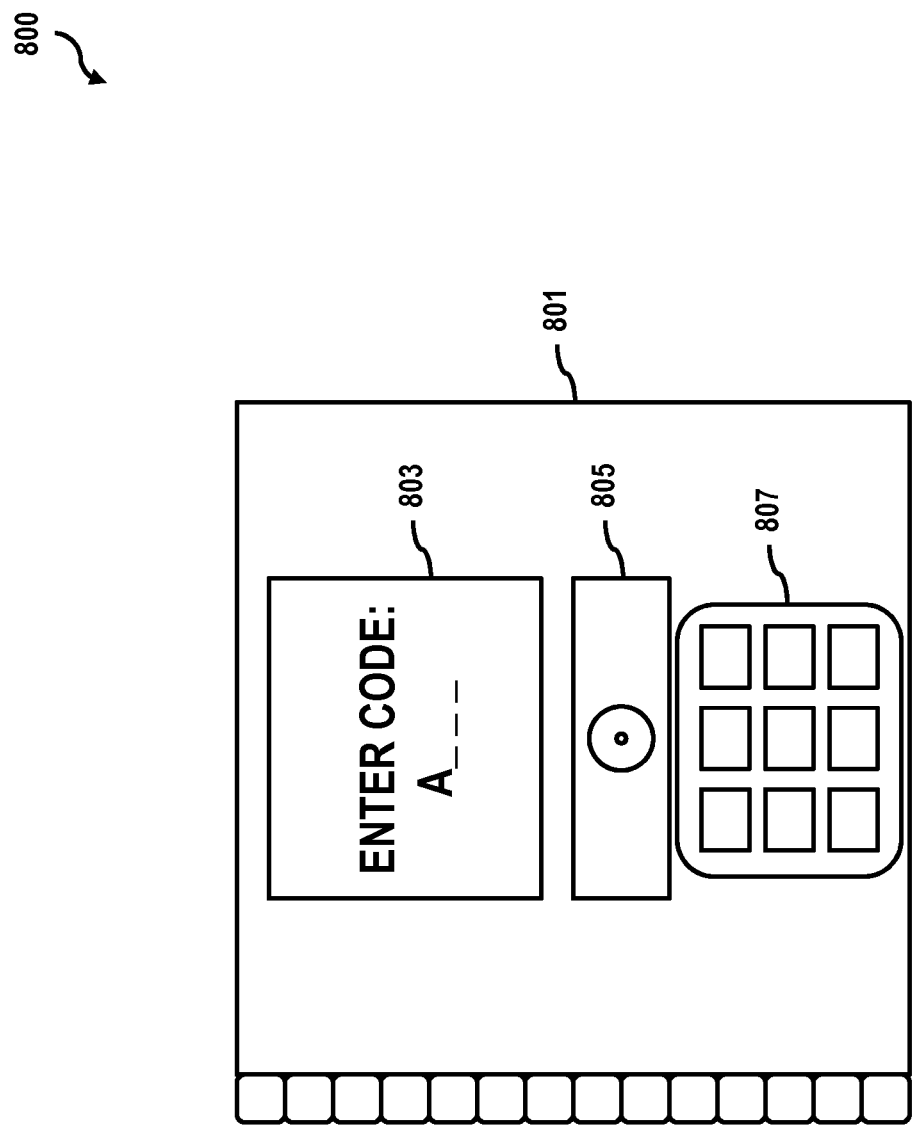
Figure 8D:
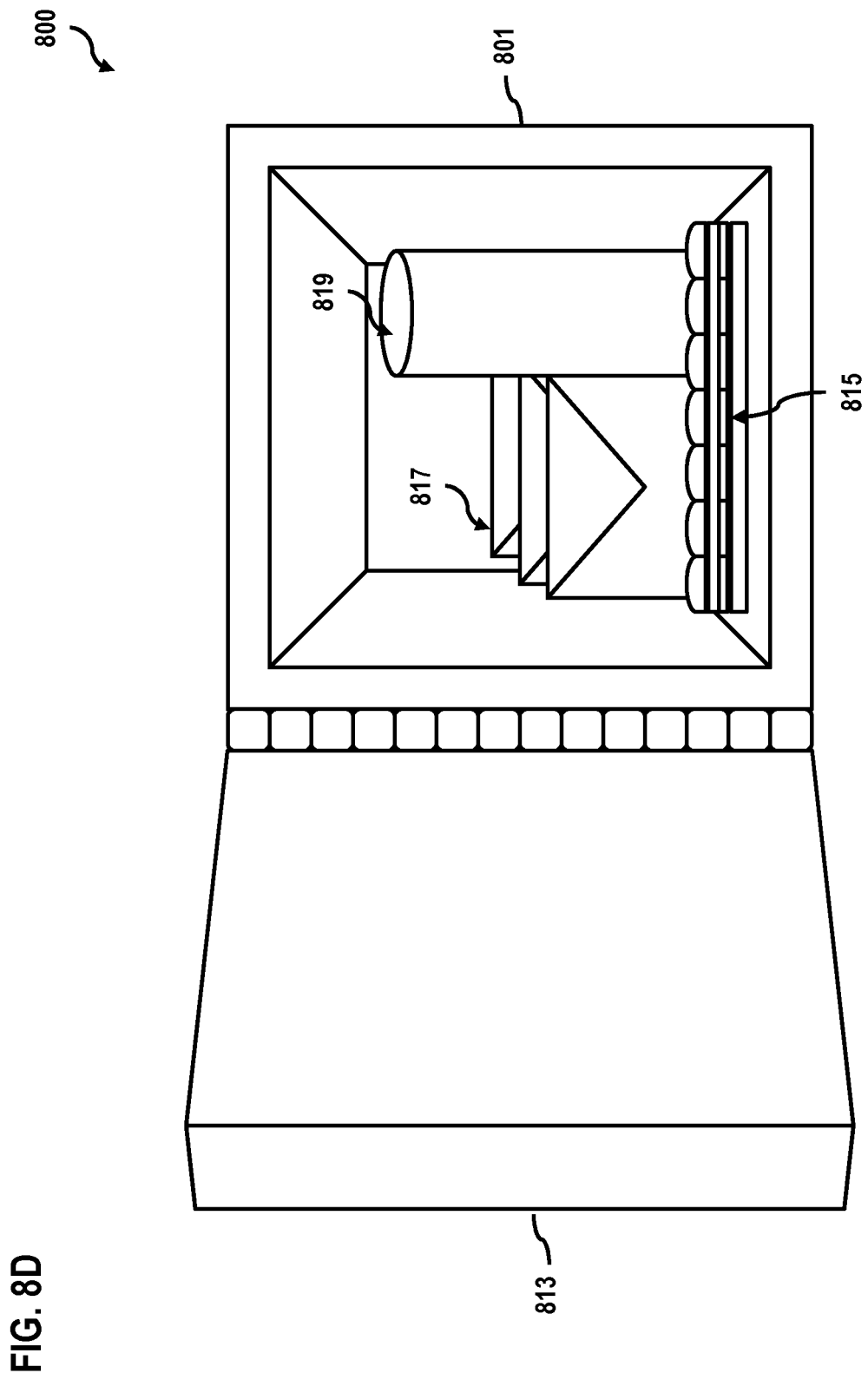

FIGS. 8A-8D are diagrams of schematic representations of an exemplary secure storage device. Specifically, FIG. 8A represents an exemplary embodiment 800 at time $t_o$, FIG. 8B represents the exemplary embodiment 800 at time $t_1$, FIG. 8C represents the exemplary embodiment 800 at time $t_2$, and FIG. 8D represents the exemplary embodiment 800 at time $t_3$.

As illustrated in FIG. 8A, exemplary embodiment 800 includes a box 801 with a door containing a display 803, scanner 805 and keypad 807. The door may be electronically unlocked by use of the display 803, scanner 805, keypad 807 or a combination thereof.

FIG. 8A represents an exemplary embodiment 800 at time $t_o$, wherein a user may read on the display 803 that the desired printed material is located within a box 801. The display 803 may provide information on current contents of the box 801, whether a print job is ready, for example "Print Job: A3102 Ready" and/or the expected time to complete preparation of print material for a pending action. It is contemplated that a near field device may be used to change the information on the display 803, to for example, direct a user to the correct location. Additionally, the information on the display 803 may change in response to input selections on a keypad 807.

FIG. 8B represents an exemplary embodiment 800 at time at time $t_1$, wherein the user presents to the scanner 805, authenticating information 809, for example, a bar code displayed on a screen located on mobile device 811 (e.g., mobile device 101). The user may input a command on the mobile device 811 to display authenticating information 809, or the mobile device 811 may use a near field, or a location detection technology to automatically display a bar code. The display 803 may indicate when scanning has been successfully completed, for example, by displaying "Scanning Please Wait."

FIG. 8C represents an exemplary embodiment 800 at time $t_2$, wherein a user may input a code into keypad 807 and input information is shown on the display 803. The display 803 may prompt the user to provide additional authenticating information, for example by displaying "Enter Code: A_ _ _." Additionally, display 803 may prompt a user to provide a confirmation to the printing terms or suggest additional services.

FIG. 8D represents an exemplary embodiment 800 at time at time $t_3$, wherein a door 813 unlocks and allows the user access to the printed material 815. It is contemplated that the door 813 may electronically open, or a slot may push out a package containing printed information. Additionally, the box may contain additional items, for example envelopes 817 packaging materials 819, and the like, that the box can detect when removed.

Figure 9:
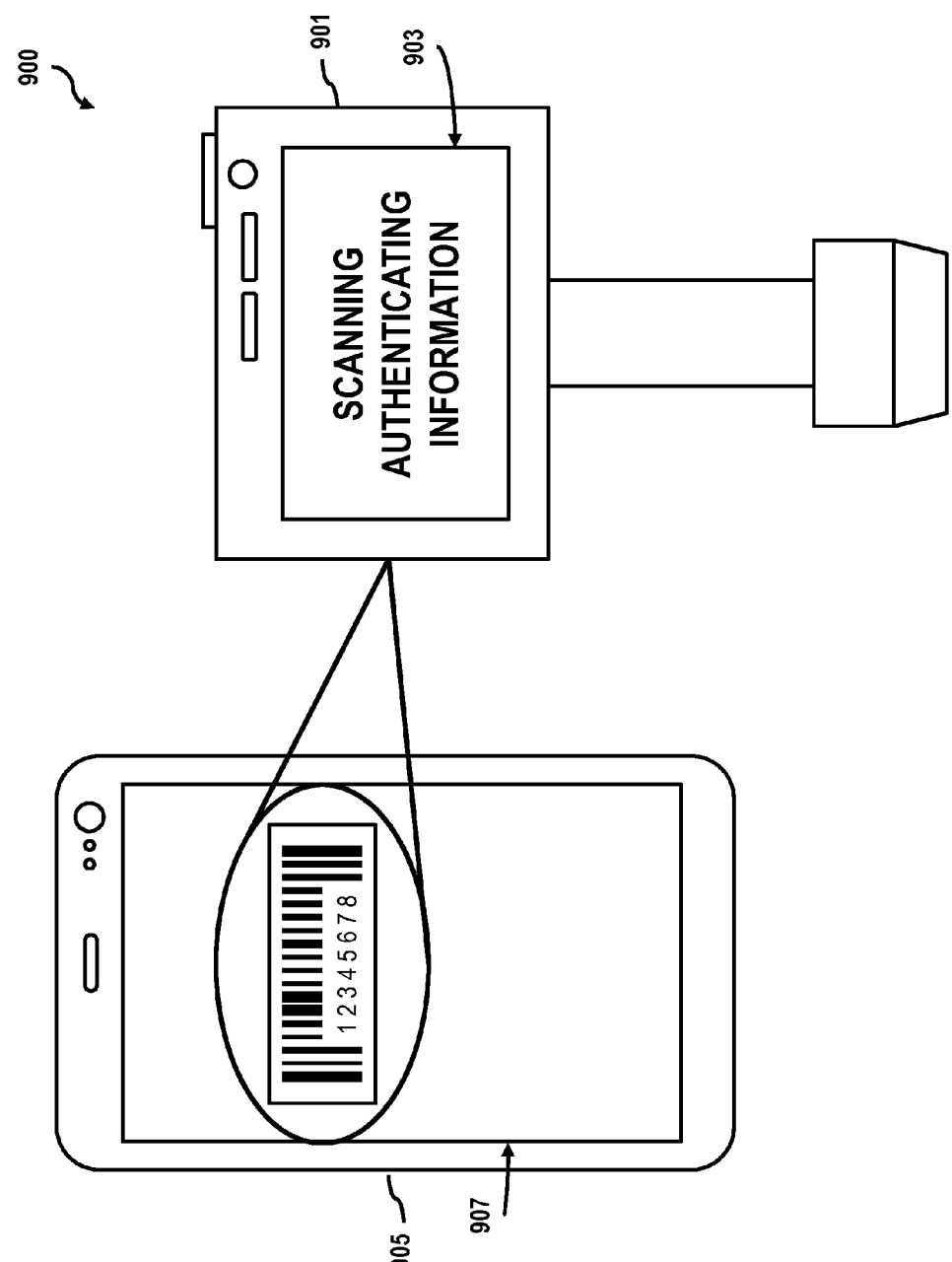
FIG. 9 is an illustration of one embodiment for providing a print station with access to authenticating information.

FIG. 9 represents an exemplary embodiment 900 of the scanning of authenticating information displayed on a mobile device 101. As illustrated in FIG. 9, exemplary embodiment 900 includes a scanning device 901 with a display 903, and a mobile device 905 (e.g., mobile device 101) containing a display 907 displaying authenticating information, for example a bar code. In this example, a user may place mobile device 905 near scanning device 901 to enable scanning device 901 access to authenticating information displayed on display 907. Additionally, a user may be provided status information on display 903, for example "Scanning Authenticating Information." It is contemplated that the scanning device 901 may be part of a mobile device 101, print station 103, the printing platform 105, or another device shown of system 100.

Figure 10:
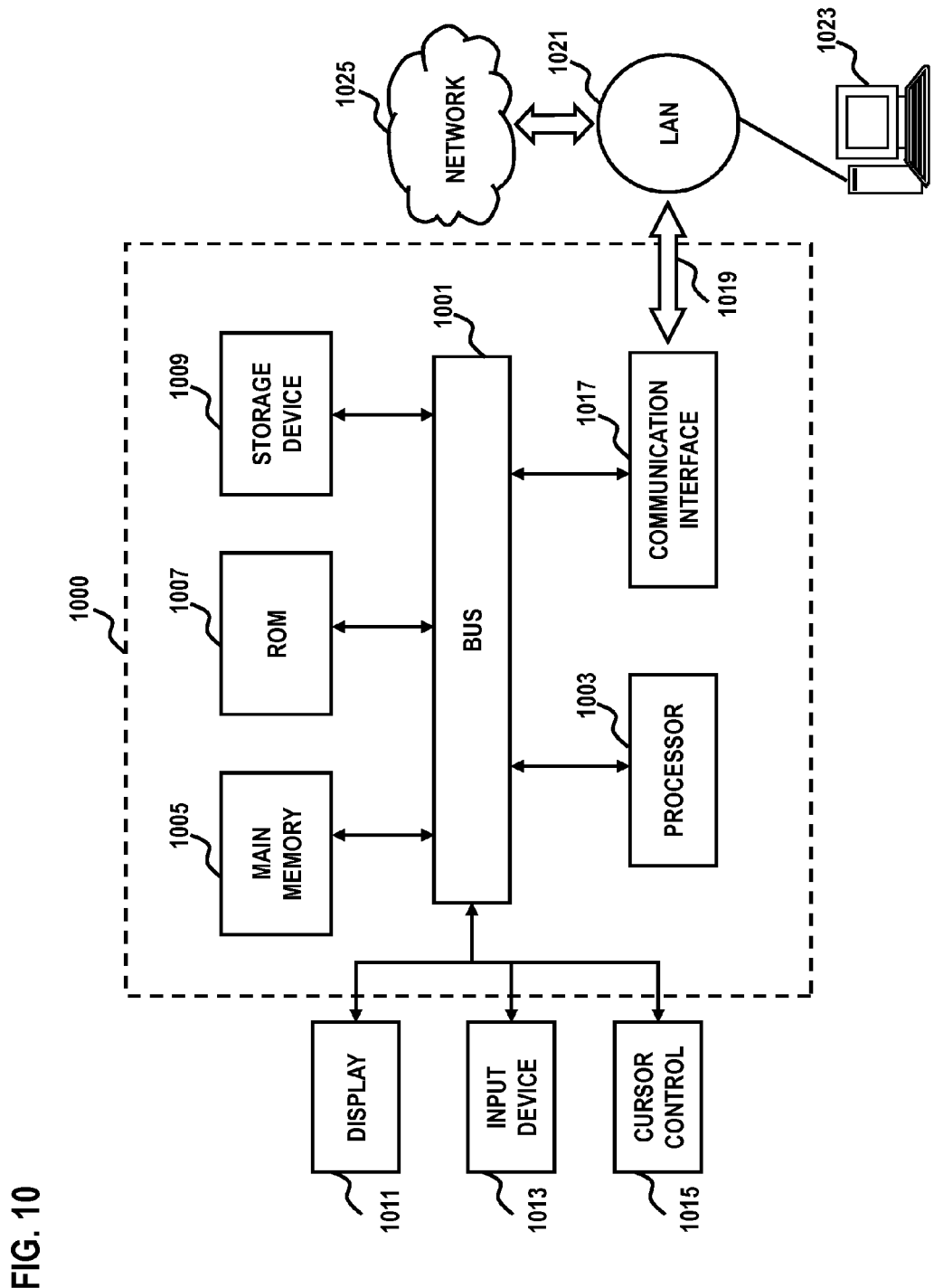

FIG. 10 illustrates computing hardware (e.g., computer system) 1000 upon which exemplary embodiments can be implemented. The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a touch screen or a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to an exemplary embodiment, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement exemplary embodiments. Thus, exemplary embodiments are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g., for Ethernet™ or an Asynchronous Transfer Model (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g., a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an exemplary embodiment through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 11 illustrates a chip set or chip 1100 upon which an embodiment of the invention may be implemented. Chip set 1100 is programmed to enable the functionality of printing platform 105 as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of enabling the functionality of printing platform 105.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to enable the functionality of printing platform 105. The memory 1105 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    receiving, at an apparatus embedded in a mobile device, a printing request including one or more packaging terms, wherein the printing request is initiated by a user of the mobile device;
    determining by a global positioning system receiver of the mobile device a target location associated with the mobile device,
    determining by the apparatus one or more target print stations capable of generating printed materials of the print request packaged based upon the one or more packaging terms, and based at least in part on the target location, wherein the one or more packaging terms include one or more physical packaging materials other than the printed materials, and the one or more physical packaging materials include one or more electronic article surveillance tags;
    provisioning by the apparatus to the mobile device a type of installation of a printing service with printer location information of the one or more target print stations and price information;
    generating by the apparatus authenticating information associated with a user selected target print station of the one or more target print stations made via a presentation interface of the mobile device, wherein the authenticating information include one or more biometric indicators, and the biometric indicators include DNA, odor, scent, or a combination thereof;
    displaying, by the presentation interface, the printer location information in a topological map with one or more point-of-interest markers associated with one or more secured containers, the price information and container information of the one or more secured containers;
    transmitting, by the apparatus, a request to the selected target print station to generate and package the printed materials based upon the one or more packaging terms and to transport the packaged printed materials to a secured container associated with the selected target print station to store the packaged printed materials therein, wherein the secured container includes a door containing a display, a scanner, and a keypad, and the door is secured by one or more electronic locks and electronically unlocked by use of the display, the scanner, and the keypad;
    determining by the global positioning system receiver of the mobile device directions to the secured container;
    displaying by the presentation interface the directions and the authenticating information for the user of the mobile device to retrieve the printed materials that are generated in response to the printing request, packaged based upon the one or more packaging terms, and stored in the secured container;
    scanning by the scanner of the secured container the authenticating information displayed on the presentation interface of the mobile device;
    unlocking by the secured container, the secured container storing the stored printed materials based on the scanning;
    receiving one or more hardware dangles;
    disabling by the one or more hardware dangles the one or more electronic article surveillance tags packaged on the printed materials; and
    displaying at the presentation interface notification of one or more status updates of the printed materials.

2. A method according to claim 1, further comprising:
    scheduling by the apparatus generation of the printed materials in response to a plurality of printing requests including the printing request, based at least in part on workflow of the one or more target print stations; and
    determining by the apparatus the price information for the generation of the printed materials associated with the one or more target print stations based, at least in part, on one or more print file characteristics and the one or more packaging terms, and the scheduling of the generation.

3. A method according to claim 2, further comprising at least one of:
  increasing a price at a print station that is reaching a predetermined maximum printing capacity, and
  reducing a price at a print station that is operating at a predetermined under-utilization printing capacity,
  wherein the mobile device selects the print file characteristics, the price information, the one or more target print stations, or a combination thereof, and wherein the one or more physical packaging materials include visible marketing information.

4. A method according to claim 1, further comprising:
  causing, at least in part, securing of the printed materials within the secured container associated with the selected at least one of the one or more print stations.

5. A method according to claim 1, further comprising:
  determining by the apparatus one or more delivery terms, one or more pickup terms, or a combination thereof associated with the printing request, the printed materials, or a combination thereof; and
  causing by the apparatus retrieval of the printed materials based, at least in part, on one or more delivery terms, one or more pickup terms, or a combination thereof;
  displaying by the presentation interface:
    a first section specifying a location input,
    a second section specifying a print file,
    a third section specifying print options,
    a fourth section specifying a user profile,
    a fifth section specifying print stations,
    a sixth section specifying printing terms, and
    a seventh section specifying an agreement to print.

6. A method according to claim 5, further comprising:
  transmitting the print file from the mobile device to the selected target print station via a code division multiple access, a high-frequency wireless local area network, or a combination thereof.

7. A method according to claim 1, further comprising:
  initiating a generation of the printed materials based, at least in part, on a validation of the authenticating information,
  wherein the validation is based, at least in part, on a comparison of presented authenticating information against the generated authenticating information.

8. A method according to claim 1, further comprising:
  causing a sending of the authenticating information from the mobile device to one or more other mobile devices,
  wherein the authenticating information for retrieval of the printed materials is provided by the one or more other mobile devices.

9. A method according to claim 1, further comprising:
  initiating transmission to the secure container new directions to another location for retrieval of the printed materials; and
  causing the display to show the new directions thereon; and
  displaying on the display current contents in the secured container, whether the printed materials are ready, an expected complete time of the printed materials, or a combination thereof; and
  wherein the transmission is initiated by a near field device.

10. A method according to claim 1, wherein the printer location and price information includes one or more pricing terms corresponding to one or more printing factors and the one or more packaging terms.

11. A method according to claim 1, further comprising:
  transcribing by the apparatus audio data in response to the printing request to provide one or more transcripts; and
  including by the apparatus the one or more transcripts as a part of the printed materials in the secured container.

12. A system comprising:
  a mobile device configured to:
    receive a printing request including one or more packaging terms, wherein the printing request is initiated by a user of the mobile device;
    determine by a global positioning system receiver of the mobile device a target location associated with the mobile device;
    determine one or more target print stations capable of generating printed materials of the print request packaged based upon the one or more packaging terms, and based at least in part on the target location, wherein the one or more packaging terms include one or more physical packaging materials other than the printed materials, and the one or more physical packaging materials include one or more electronic article surveillance tags;
    provision to the mobile device a type of installation of a printing service with printer location information of the one or more target print stations and price information;
    generate authenticating information associated with a user selected target print station of the one or more target print stations made via a presentation interface of the mobile device that selects one of the one or more target print stations, wherein the authenticating information include one or more biometric indicators, and the biometric indicators include DNA, odor, scent, or a combination thereof, and wherein the presentation interface is configured to display the printer location information in a topological map with one or more point-of-interest markers associated with one or more secured containers, the price information and container information of the one or more secured containers;
    display notification of one or more status updates of the printed materials; and
  a secured container;
    wherein the secured container is associated with the selected target print station, wherein the secured container includes a door containing a display, a scanner, and a keypad, and the door is secured by one or more electronic locks and electronically unlocked by use of the display, the scanner, and the keypad;
    wherein the mobile device is further configured to transmit a request to the selected target print station to generate and package the printed materials based upon the one or more packaging terms, to transport the packaged printed materials to the secured container to store the packaged printed materials therein;
    wherein the mobile device is further configured to determine via the global positioning system receiver of the mobile device directions to the secured container;
    wherein the presentation interface is further configured to display the directions and the authenticating information for the user of the mobile device to retrieve the printed materials that are generated in response to the printing request, packaged based upon the one or more packaging terms, and stored in the secured container;
    wherein the secured container is configured to use the scanner to scan the authenticating information displayed on the presentation interface of the mobile device, and to unlock the secured container storing the stored printed materials based on the scanning; and wherein the one or more electronic article surveillance tags packaged on the printed materials is configured to be disabled by one or more hardware dongles.

13. A system according to claim 12, wherein the mobile device is further configured to:
determine the price information for generating the printed materials associated with the one or more target print stations based, at least in part, on one or more print file characteristics.

14. A system according to claim 13, wherein the mobile device determines the print file characteristics, the price information, the one or more target print stations or a combination thereof.

* * * * *